(12) United States Patent
Rath et al.

(10) Patent No.: US 8,968,004 B2
(45) Date of Patent: Mar. 3, 2015

(54) INTEGRATED MULTIMEDIA TOOL SYSTEM AND METHOD TO EXPLORE AND STUDY THE VIRTUAL HUMAN BODY

(75) Inventors: Matthias W. Rath, Aptos, CA (US); Aleksandra Niedzwiecki, Aptos, CA (US)

(73) Assignee: Matthias W. Rath, Aptos, CA (US)

( * ) Notice: Subject to any disclaimer, the term of this patent is extended or adjusted under 35 U.S.C. 154(b) by 220 days.

(21) Appl. No.: 13/209,382

(22) Filed: Aug. 13, 2011

(65) Prior Publication Data

US 2013/0040273 A1    Feb. 14, 2013

(51) Int. Cl.
 *G09B 23/28* (2006.01)
 *G09B 5/06* (2006.01)
(52) U.S. Cl.
 CPC . *G09B 23/28* (2013.01); *G09B 5/06* (2013.01)
 USPC .................................................... 434/272
(58) Field of Classification Search
 USPC ........................................ 434/262, 267, 272
 See application file for complete search history.

(56) References Cited

U.S. PATENT DOCUMENTS

| | | | |
|---|---|---|---|
| 2004/0064298 A1* | 4/2004 | Levine | 703/11 |
| 2009/0317781 A1* | 12/2009 | Oosthuizen | 434/267 |
| 2010/0179428 A1* | 7/2010 | Pedersen et al. | 600/443 |

* cited by examiner

*Primary Examiner* — Kesha Frisby
(74) *Attorney, Agent, or Firm* — Geeta Kadambi; Riddhi IP LLC

(57) ABSTRACT

Several methods, processes and system for modular tool as an integrated multimedia tool system to explore and study the virtual human body is disclosed. Content and context modules allow for scientific gaming using modular multimedia objects, social media and different configurations. The disclosure allows an individual to travel through the virtual human body in a self guided and interactive tour. It specifically enables the user to learn the structure and function of different organs, different types of cells, intercellular space as well as different cellular organelles etc. Further, the system may be used by the local authority as an electronic study tool for seamless integrated mode of delivering the educational tool suited to the local curriculum. This may also serve as a tool for patients, doctors, focus groups and student to explore and learn about the pathological and physiological conditions in a human body.

15 Claims, 21 Drawing Sheets

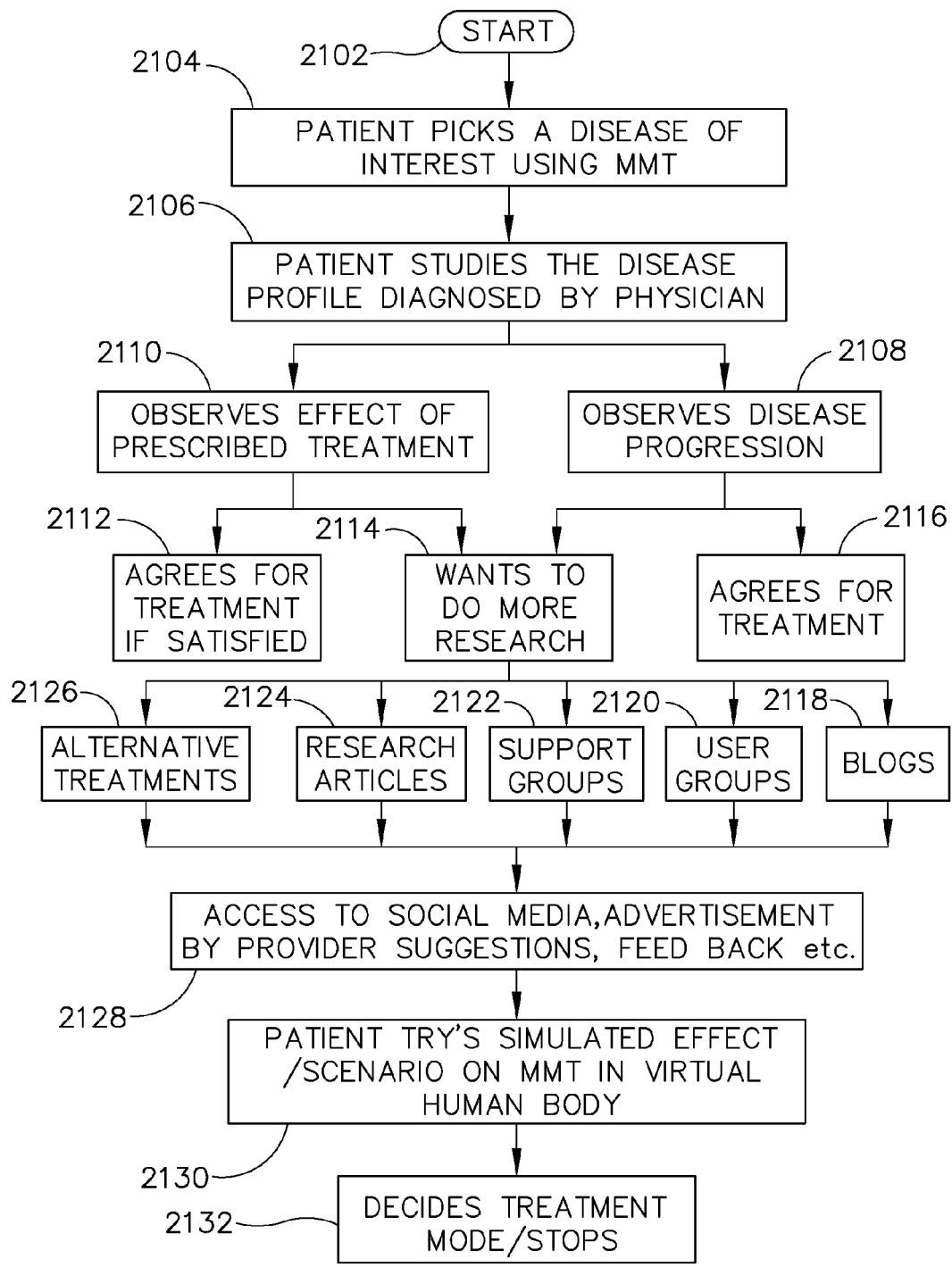
Figure 21   PATIENT PROCESS FLOW 2100

INTEGRATED MULTIMEDIA TOOL SYSTEM AND METHOD TO EXPLORE AND STUDY THE VIRTUAL HUMAN BODY

FIELD OF TECHNOLOGY

This disclosure relates generally to a field of a modular multimedia tool, to be used as an integrated system and a method to explore, study and interact with other users in the virtual human body. More particularly, it relates to a social media enabled educational tool that is useful for educating, learning and understanding the working of the human body.

BACKGROUND

Learning material may be available in limited formats for distribution and use to an individual. An individual may have difficulty in learning the material with a limited format that is provided to them. There may be time constraints for an individual to finish the particular content for learning in a given time. The individual may also have learning disability to learn the learning material in a conventional manner.

The learning material may be delivered in a stationary manner, thus preventing the user from accessing the learning material when the user is on a move. The individual may be home bound for example due to sickness, inclement weather or lack of transportation and still want to pursue his learning without disruption.

There is need for an alternate format of educational tool that may be suitable for all ages and several disciplines, demographics and stages in medicine.

SUMMARY

Several method, process, apparatus and systems for informational, integrated and interactive educational modules using modular multimedia tools are disclosed. In one embodiment, the modular multimedia tools are educational material for medical, physiological and pathological conditions shown in the virtual human body.

In one embodiment, a multimedia tool is generated using modules for graphical illustration, narrations, means for participation and collaboration. In another embodiment, the multimedia tool may be used as an educational module for a user to learn, explore, educate and interact with other users.

In one embodiment, a user can participate in creating the content, study the content, share the content and interactively use the content. The user may also travel or tour the virtual human body to explore at a physiological system level, organ level and cellular level. In another embodiment, the user may interactively observe, change and learn effect of modulation of at least one of micronutrients, drugs, environmental toxins and pathogen levels and their effect on cellular level, organ level and pathological level. Micronutrients may be, not limited to, vitamins, amino acids, supplements, drugs may be chemotherapy drugs, antibiotics, antihistamines, steroids etc, pathogens may be virus, bacteria, etc.

In one embodiment, a developer, an user and a professional (such as instructor, physician but not limited to) and an involved participant such as a parent or a nurse may connect with each other using the multimedia tool to clarify, teach and observe the social media interaction and guide the other participants in a educational process of understanding the physiological condition, pathological condition and simple mechanism of physiological functions. The user may be a student, patient and/or a gamer.

In one embodiment, in a social media environment or a internet connected environment an advisor or a service provider may be able to advertise for a specific drug, micronutrient or a supplement, food for a particular physiological condition. The user may, for the current instance, be able to get the address, location or directions to the nearest store or place of treatment for a particular good or treatment condition. The current instance example may be the user is reading about effect of micronutrients such as vitamin C and the service provider may pop an advertisement on the side where and how to get to a location where the user can find commercially available vitamin C.

In one embodiment, the multimedia tool may allow the user to play a video game individually or interactively. The multimedia tool, in one embodiment may display the graphics in a three dimensional view.

In one embodiment, a method to explore a virtual human body is described. In another embodiment, a user can enter the human body at a system level and explore the circulatory system for example. In another embodiment, a user can take any form or a robot form and get into the cellular structure and visualize and learn about the various functions of the different components of the cellular system. In another embodiment, the user can understand the different functionality of micronutrients affecting the microenvironment of the cells and their effects of modulation in the cell by being present as a component of a cell, foreign object, or a cellular organelle.

In another method, the user can observe the formation of a disease state such as an atherosclerotic plaque in the walls of an artery. The instructor may narrate the event for the user such as a student to understand the implications of plaque formation and subsequent events in a virtual human body.

In one embodiment a system includes an authoring module for a content module to create a first meta-data associated with each of the learning object with the first meta-data describing a context of each of the learning object. The system also includes an exercise module of the content module to create an assessment format. The user may use the assessment format to pass an exam or in gaming get to the next level. The system also includes an import module of the content module to enable import of an audio and/or a video file of the learning object to be included with the authoring module. Further, the system includes an evaluation module of the content module to provide a feedback to an interested party and user-score to a local authority. The system also includes a tagging module of the authoring module to assign a second meta-data to each of the learning objects with the second meta-data describing a context of the each of the learning objects. In addition, the system includes an executable module of the authoring module to generate a set of executable files associated with an electronic device having two or more of the learning objects. Further, the system also includes a course creation module of the authoring module to generate an e-learning course according to a media type of an electronic device based on a set of executable files and other types of files.

The system may include a learning module of a context module to create a set of an interactive content based on a requirement of a user, and a reiteration module of the context module to create a set of learning modules to revise a learning module based on a request by the user. The system may also include a self-evaluation module of the context module to create a self assessment exercise that may enable the user to self evaluate and an update module of the context module to summarize the content of the learning module. Further, the system may include a revision module of the context module to enable the user to write a summary of the interactive content with the learning module, and a reporting module of the context module to provide a feedback to an interested party and a user score to a local authority.

In addition, the system includes a course creation module of the authoring module to create a number of auxiliary files associated with a set of executable files to support the executable files based on the learning objects with an animation, an image, and other media type. The number of auxiliary files may include one or more of a flash file, an image file, a portable document format (pdf) and/or a media file.

The revision module of the context module may enable the user to custom chain the learning objects in an interactive interface. The system may also include a translation module for converting the learning objects from one language to another language as specified by the user. The content module and the context module may be compatible with a multimedia device and/or an electronic device. The system may include an animation module to enable the user to electronically draw a sketch, a cartoon, a flow chart and/or a note. The system may also include a distance learning module to provide the user with real time access to the content module and the context module.

In one embodiment, one may create a virtual human body as a modular multimedia tool for an individual to study, train, teach, learn and investigate using a machine readable media. In another embodiment one may enable the individual to choose a position to enter the virtual human body and travel and investigate through the virtual human body at least one of a cellular level, organ level and a system level; and connect with a social media tool to at least one other user to interact and travel through the virtual human body.

In another embodiment, a method includes creating a content to comply with a local authority rule, embedding the content to a user profile, a user preferred media and/or a user preferred time, and automatically updating the content on a periodic basis based on a local authority rule change, a change in user profile and/or a media change. The method also includes presenting a solution to a user generated query by an author, analyzing an evaluation form submitted by the user in compliance with a local authority rule using a processor and processing the evaluation form for a specific task in response to the local authority rule. In addition, the method also includes recording the evaluation form to perform retrieval, an archival and a reporting, and updating the evaluation form as a record for one or more of the retrieval, the archival and/or the reporting.

The method may include communicating an e-learning course to a context management module which interfaces with a device of a user choice. The method may also include searching for a learning object in a repository based on a context query data using a processor, and encrypting a learning object of the context module and content module to prevent an unauthorized user from accessing the learning object. Further, the method may also include supporting a media device, a mobile device, a computer and/or a communication device, and enabling a local authority to access the record of a user of choice.

The method may include collecting the learning object to one or more of a reading activity, a reviewing activity, a revising activity and/or an evaluating activity, and writing a summary after the reading activity, the reviewing activity, the revising activity and/or the evaluating activity. The summary may be a game, a comic, a movie, a flash card, a quiz, a text, an audio recording and/or a video recording. The method may include recording a set of finished learning objects to comply with a local authority requirement, and sharing with a peer one or more of the game, the comic, the movie, the flash card, the quiz, the audio recording, and/or the video recording.

In one embodiment, a method may also allow the individual in acquiring data about a disease diagnosed by a physician in detail using the modular multimedia tool created for the virtual human body; viewing a progression of the disease diagnosed by the physician in detail and learning the implications of a natural progression of the disease; researching the implication of the proposed treatment plan and browsing at least one of a blog, social media group, user group and alternative treatment sites; and deciding on a treatment method plan with the physician. This would provide a decision making ideas for the individual, who may be a patient, relative or advisor.

Sharing with the peer may require a special permission and/or a group password protection. Further, the method may include accessing the learning object from a remote location, combining the learning object to form a theme, making a game of the learning object for one or more of a single user and a multiple user, and enabling the user to obtain credit to comply with the local authority rule. The learning object may be condensed to deliver on a mobile device in a modular form. The method may also include enabling the user to access a condensed learning object on the mobile device. In addition, the method may include creating a revision card for a specific topic of the learning object, and accessing the revision card in an electronic device, a network application and a print media. The whole set of modules may be created and run on a hardware such as a server or computer or a mobile device operating system to display, use and upload and transform the content.

In some embodiments, a process may include creating a content for the content module for a multimedia tool having a capability to display a virtual human body at least one of at a cellular level, organ level and a system level; permitting an individual to enter the virtual human body using a transportation system of choice through the multimedia tool to travel through at least one of at the cellular level, organ level and a system level; initiating a gaming module to enable the individual to play a tour of the virtual human body and modulate the microenvironment at least one of at the cellular level, organ level and a system level.

In another embodiments, a process may enable transforming the location positioning system of the transportation system of choice from at least one of cellular level, organ level and system level; seamlessly transforming the graphical user interface from at least one of a cellular level, organ level and a system level as the individual changes his mind to explore different levels, permitting a service provider to advertise, sell and solicit at least one of nutritional product and a medicine of choice, granting role play capability for one or more individuals to participate in a disease condition, connecting a at least one of a health care professional, student, teacher, parent and service provider to the individual, and enabling an authority to upload and assess the individual performance of a student for a particular educational level.

The methods, systems and processes disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 21 is a flow chart of patient process flow 2100, in one embodiment.

Other features of the present embodiments will be apparent from the accompanying drawings and from the detailed description that follows.

DETAILED DESCRIPTION

Several method, process and systems for informational, integrated and interactive educational modules using modular multimedia tools for medical, physiological and pathological conditions of the virtual human body are disclosed. Although the present embodiments have been described with reference to specific example embodiments, it will be evident that various modifications and changes may be made to these embodiments without departing from the broader spirit and scope of the various embodiments.

Figure 1:
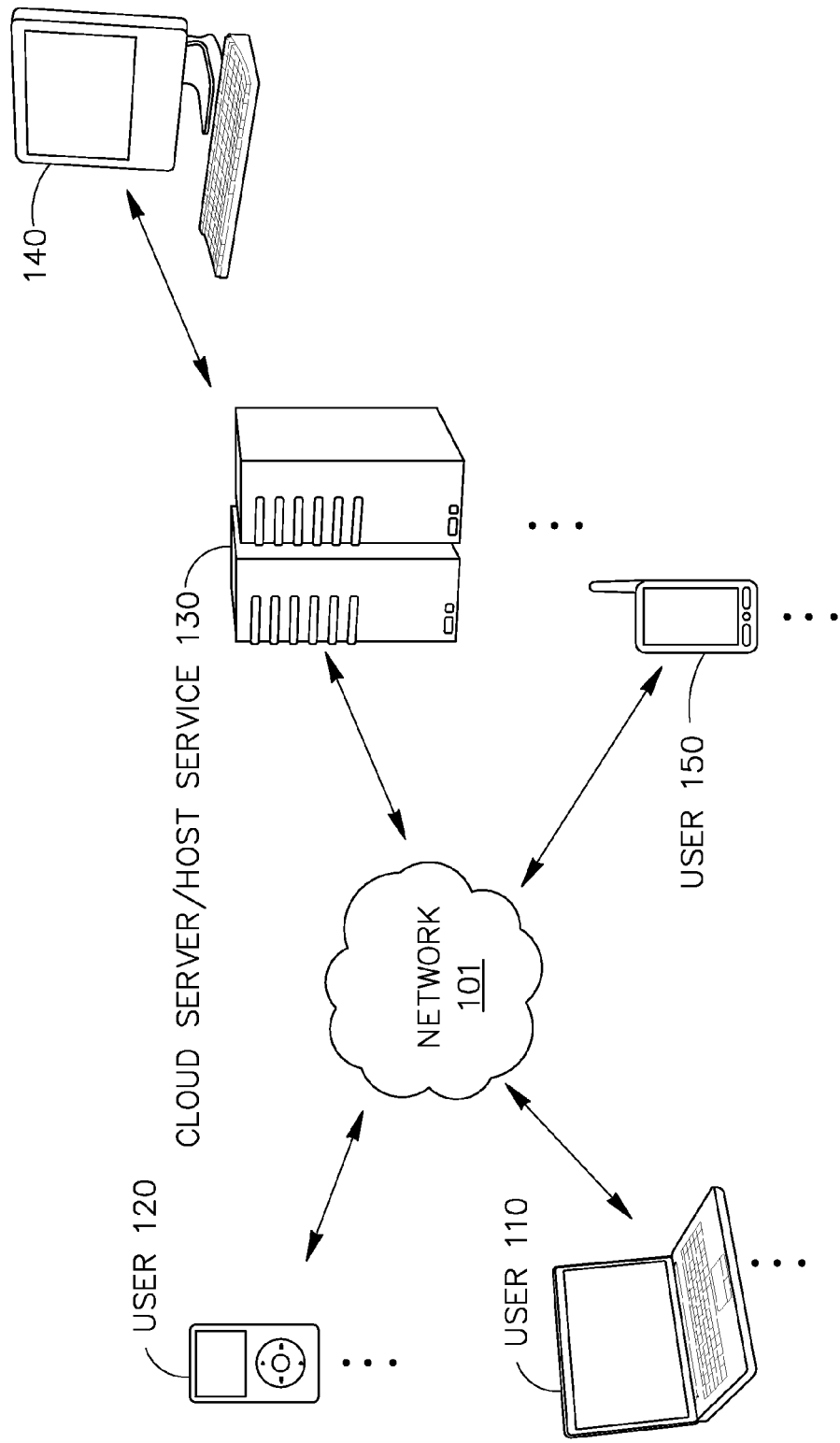
FIG. 1 is a systematic view of an integrated system for visual science education 100 illustrating communication between user and the server through a network, according to one embodiment.

FIG. 1 is a systematic view of an integrated system for visual science education 100 illustrating communication between user and the server through a network, according to one embodiment. In one embodiment a user or multiple users may connect to the server that hosts the multimedia tool in the system. In another embodiment, the user hard ware such as a PDA, computer or a mobile phone or any wireless device, or an electronic book (e-book) may be connected with each other or work independently to allow the user to use the multimedia tool for education, learning, and/or interactively playing games. The network 110 may be a LAN, WAN, mobile, telecommunications, internet, intranet, WiFi and/or ZigBee network, etc. The user/individual 110, 120 and 130 and so on may be a student, a player, a teacher, a gamer, but not limited to these group of folks only. The user and individual are used interchangeably and mean the same. The user may be any person who accesses the multimedia tool for educational, recreational, gaming and evaluation purposes. The multimedia may be accessed to create content, upload content, view content, use the content and save and/or delete the content. The server may be stand alone, cloud based or hosted services.

In one embodiment, a content module 200 may communicate to a user 110-N through a network 110. The user may have several types of devices such as an electronic book, multimedia, a phone, a computer, a video game, a PDA (Portable Digital Assistant), etc. The content module 200 may include the multimedia objects related to a course. The multimedia objects may be the learning objects that may include the contents of the course. Furthermore, the learning objects may be modularized based on an educational requirement and institutional standards. The contents of the content module 200 may be provided to a context of the user's choice. A user (e.g., a school, an institution, and/or a person who may opt for a course) may select different contents based on the required objects and then select the content for the course.

Figure 2:
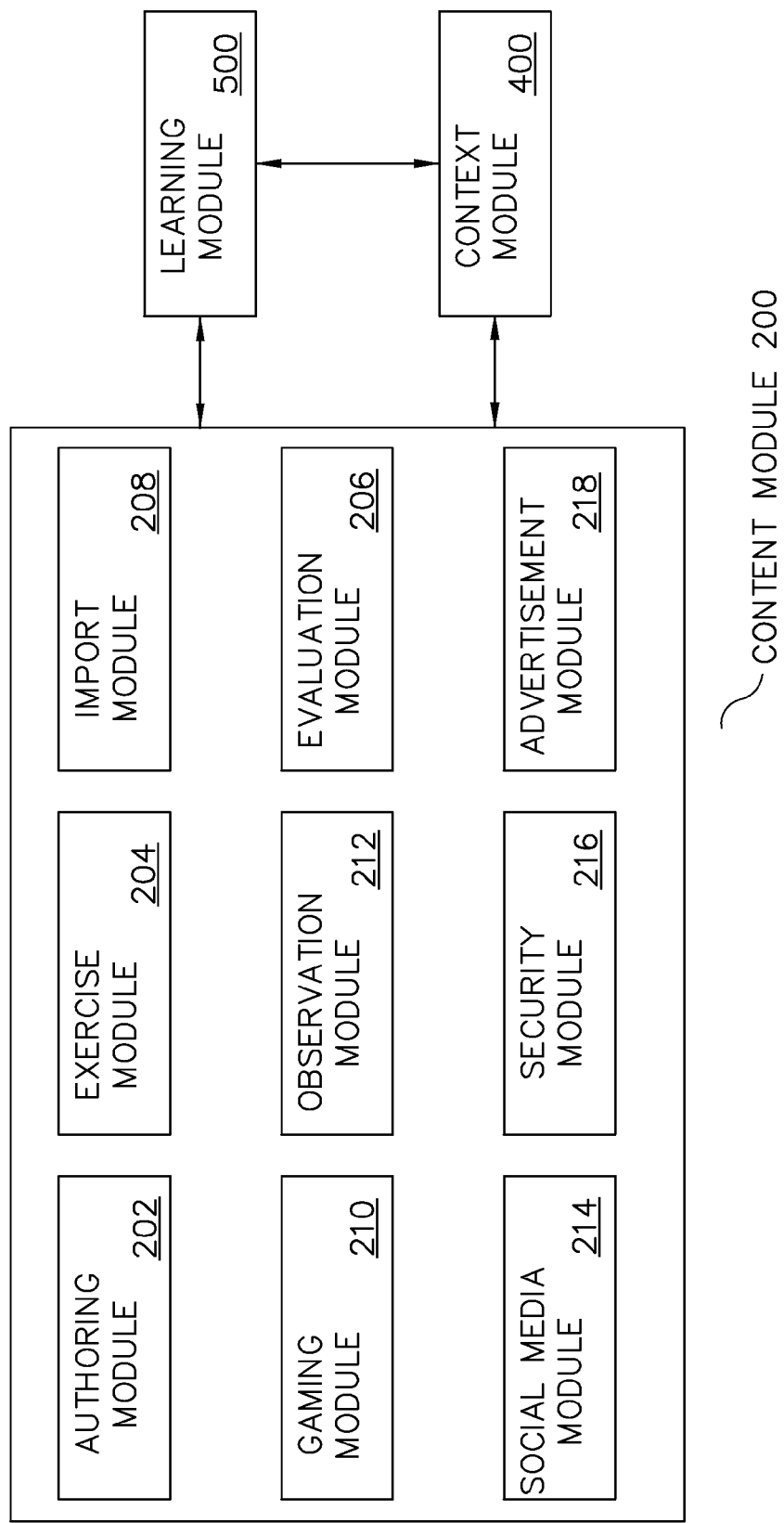
FIG. 2 illustrates an exploded view of the content module 200, according to one embodiment.

FIG. 2 illustrates an exploded view of the content module, according to one embodiment. In one embodiment, the content module 200 may include an authoring module 202, an exercise module 204, and an evaluation module 206, an import module 208, a gaming module 210, an observation and/or tour module 212, a social media module 214, security module 216 and advertisement module 218. The authoring module 202 may create a first meta-data associated with each learning/gaming object. The learning/gaming object may be a course associated with the curriculum of a school and/or an educational institution. It may also include information for patients regarding their disease condition. In one or more embodiments, the learning object may be an information object, an interactive object, a test object, etc. that may include executable files. The exercise module 204 may create an assessment format (e.g., prototype) for each of the users. The evaluation module may provide an evaluation form to the user. The user may be provided a feedback and/or a score for the assessment through the evaluation module 206. The import module 208 may enable to import an audio/video file of the learning object pertaining to a user.

The virtual human body may toured be at cellular level, system level and/or an organ level. The cellular level components are at least one of nucleus, nucleolus (within nucleus), rough endoplasmic reticulum (ER), smooth ER, ribosomes, cytoskeleton, golgi apparatus, cytoplasm, mitochondria, vesicles, lysosomes, centrosome, centrioles, red blood cells, white blood cells, bacteria, virus, t-cells, macrophages and phagocytes. The system level is at least one of circulatory system, respiratory system, digestive system, musculoskeletal system, endocrine system, integumentary system, immune system, lymphatic system, reproductive system, urinary system, vestibular system and nervous system. The organ level is at least one of a brain, amygdala, basal ganglia, brain stem, medulla, midbrain, pons, cerebellum, cerebral cortex, hypothalamus, limbic system, eye, pituitary, thyroid, parathyroids, ears, heart, lung, esophagus, thymus, pleura, adrenals, appendix, bladder, gallbladder, large intestine, small intestine, kidney, liver, pancreas, spleen, stomach, prostate, testes, ovaries, uterus, breasts, hips, legs and throat. These are just representative examples and not limited to only these examples. The observation and tour module 212 may allow the content manager, teacher and/or the user to pick a certain shape of exploration shape or transportation system of choice inside the body, pick a location to enter or exit a system, an organ or a cellular space or an organelle to be representing the as a observer. For example, a user can pick an exploration shape to be like a space ship, or mitochondria or a red blood cell or a micronutrient. This imaginative shape allows the user to learn and observe the physiological function, pathological function or system maintenance aspect of the virtual human body. The observation and tour module also enables the user, creator and the teacher to narrate the events in an audio file as the chosen imaginative shape travels through the virtual human body. The diseases are at least one of autoimmune diseases, cancer types, communication disorders, cutaneous conditions, metabolic disorders, endocrine diseases, eye diseases and disorders, genetic disorders, infectious diseases, intestinal diseases and neurological disorders.

In one embodiment, there may be more than one user at a particular place in the virtual human body interacting or narrating the events or observing the effect of change in the physiological condition, pathological condition or the functioning of the normal human body functions inside a virtual human body. As an example, the effect of micronutrient concentration increase in preventing plaque formation may be observed by the user who is travelling inside the virtual human artery. In another example the effect of a heart attack may be felt by the red blood shaped space ship as crushing effect and a jolt and/or narrowing of the artery. These are examples and the embodiments are not limited to these examples. An individual is a user, teacher, patient, software developer, system manager and not limited to these definitions.

In one embodiment, the social media module 214 may allow the user to invite and/or allow others to join the user while the user is travelling through the virtual human body. They may role play and learn a particular topic or just be part of a game. The advertisement module 218 may also allow advertisers to mine the trend, suggest retail options for the user to buy for example a particular drug, exercise place or a healthy restaurant in the vicinity and guide them using global positioning system to that address. In another embodiment, an advertisement module of the content module to enable a service provider to at least one of to advertise, sell and connect the individual to a location for their need of an item pertaining to a current instance that is happening in the modular multimedia tool. The current instance happening may be something a user is being researching for or playing a game of cause and effect.

The gaming module 210 may allow user to play games using role play to quiz, test and learn the working of virtual human body. The multimedia module may allow several users to connect with other, for example a doctor may join a patient group to explain or emulate a scenario to explain the treatment plan etc. In one embodiment, a security module of a content module to provide a secure access to user and to the local authority to access the user-score is disclosed.

Figure 3:
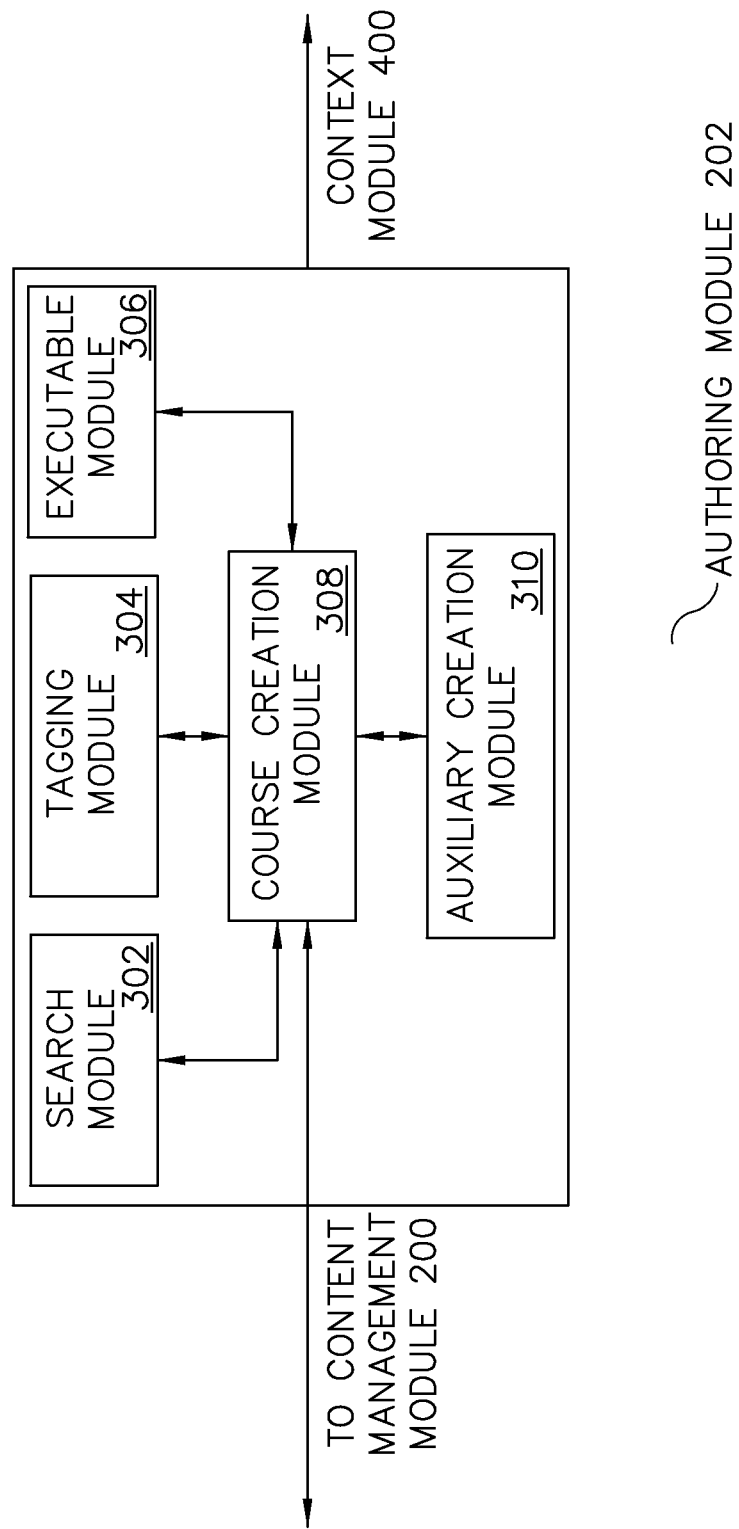
FIG. 3 illustrates an exploded view of an authoring module illustrated 300, according to one embodiment.

FIG. 3 illustrates an exploded view of an authoring module 300, according to one embodiment. In an embodiment, the authoring module 300 may include a search module 302, a tagging module 304, an executable module 306, a course creation module 308, and an auxiliary creation module 310.

Figure 6:
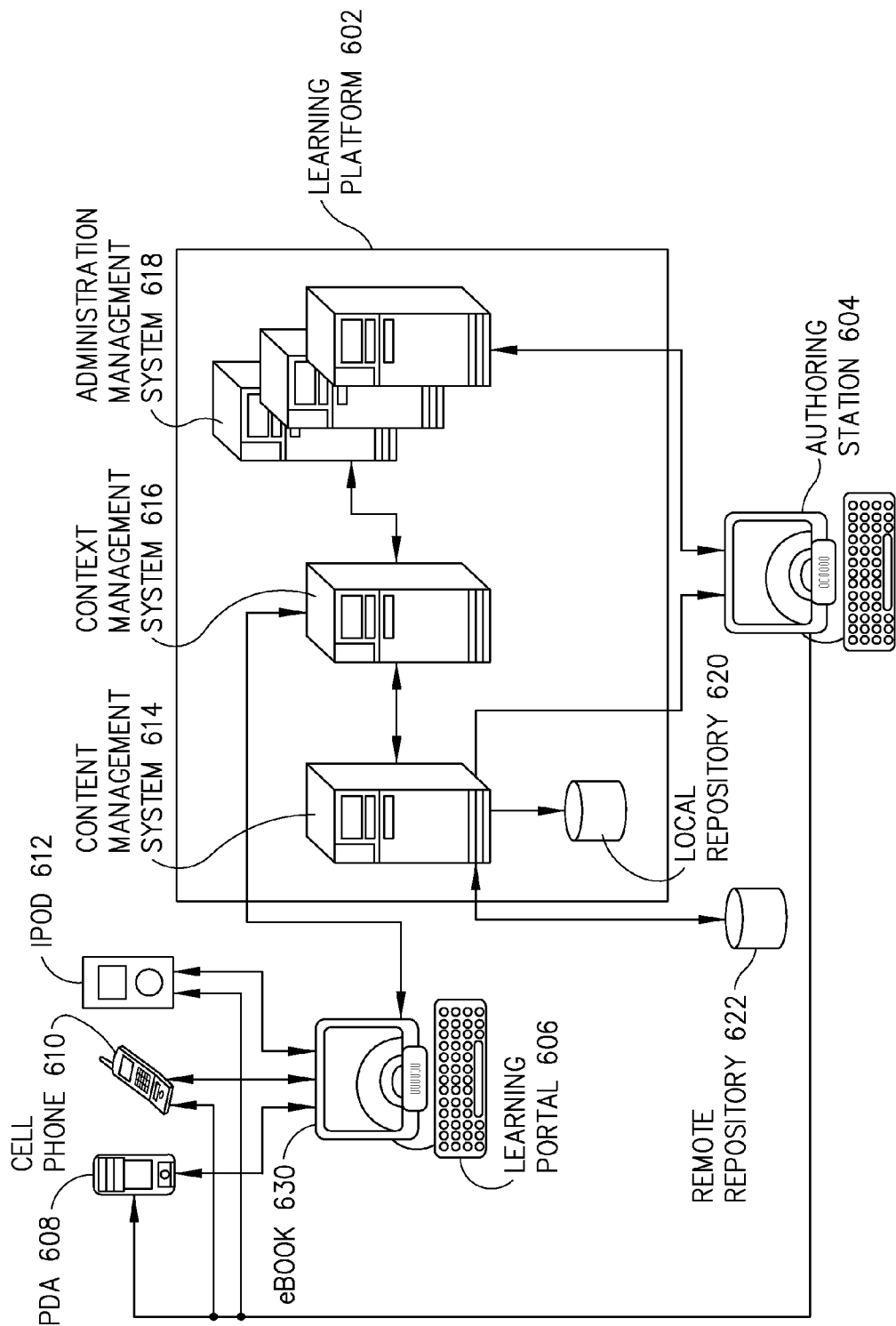
FIG. 6 is a system view illustrating a communication between a learning portal, learning platform, and an authoring station, according to one embodiment.

The search module 302 may be a search engine that may enable a user to search for a learning object in a repository (e.g., a remote repository 622 and/or a local repository 620 as illustrated in FIG. 6). The learning object may be searched based on a query data using a processor. The learning objects in this case may a chapter of human physiology or pathology for a science student or a medical student.

The tagging module 304 may assign a second metadata to each of the learning objects. The meta-data may describe a context of the learning objects. The executable module 306 may generate a set of executable files associated with an electronic device and the executable files may be related to the learning objects. The course creation module 308 may generate a course according to a media type of an electronic device based on a set of executable files and other types of files. Furthermore, the course creation module 308 may create auxiliary files associated with a set of executable files of the learning objects. The auxiliary files may include a flash file, an image file, a PDF file, a media file, etc.

Figure 4:
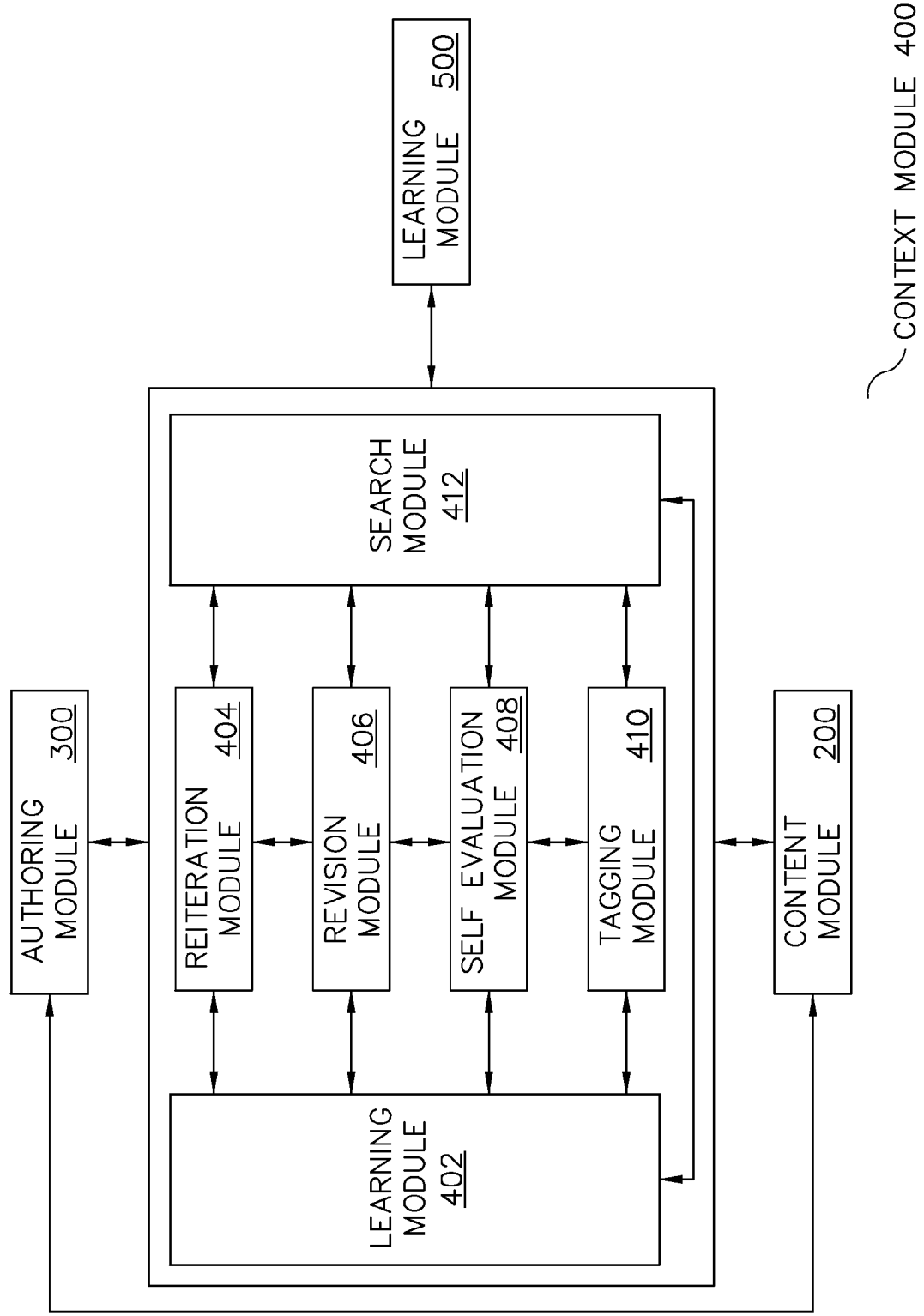
FIG. 4 is an exploded view of the context module 400, according to one embodiment.

FIG. 4 is an exploded view of the context module 400, according to one embodiment. In an embodiment, the context module 104 may include a learning module 402, a reiteration module 404, a revision module 406, a self evaluation module 408, a tagging module 410, and a search module 412. In one or more embodiments, the user may select a course to study online or the user may select to study in virtual school. The learning module 402 may create a set of an interactive objects based on a requirement of the user. The user may prefer to revise (e.g., recap) learning object of the course and may request for the learning objects from the reiteration module 404. When the user wishes to perform self assessment, the revision module 406 may provide the user a brief summary of the learning object that may enable the user to recap the studied subject. Further, the revision module 406 may also enable the user to custom chain the learning objects in an interactive interface. The self assessment exercise may be created by the self evaluation module 408. The self assessment exercise created by the self assessment evaluation may 408 may be related to the subject matter of the user's course. The tagging module 410 may provide a meta-data of the learning object that describes the context of the learning object to the learning module 402.

Figure 5:
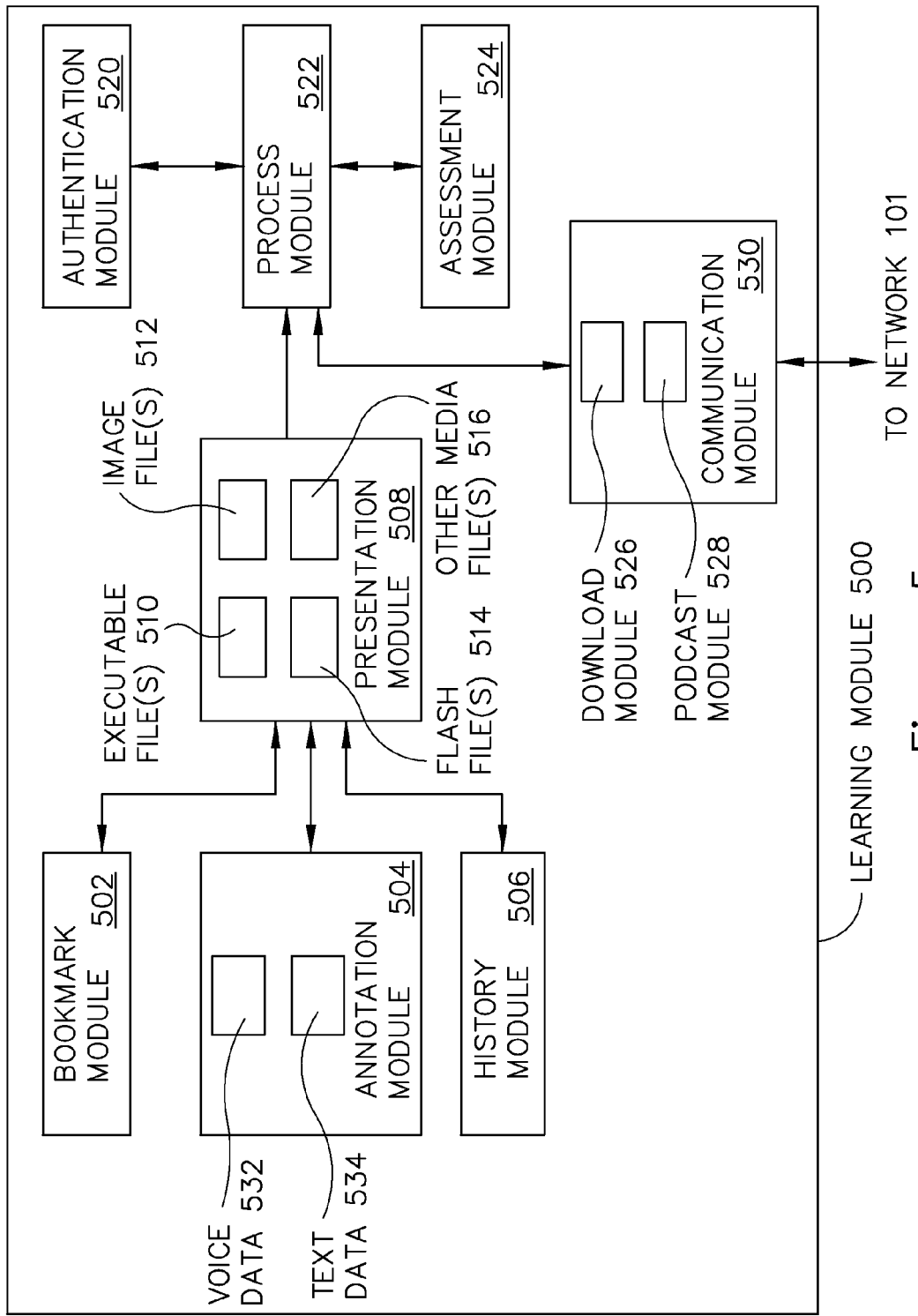
FIG. 5 is an exploded view of a learning module 500, according to one embodiment.

FIG. 5 is an exploded view of a learning module 500, according to one embodiment. In an embodiment, the learning module may include a bookmark module 502, an annotation module 504, a history module 506, a presentation module 508, an authentication module 520, a process module 522, an assessment module 524, and a communication module 530. The user may have to register with an administration management system 618 (e.g., virtual school system, and/or an institution) to study a course. After registration the user may be provided with a user name and a password to enable the user to access the related learning objects. The authentication module 520 may verify the user name and the password provided by the user. The executable file of the learning object requested by the user may be processed by the process module 522. The processed executable file and/or an auxiliary file may be presented to the user using the presentation module 508.

The presentation module may present an executable file 510, an image file 512, a flash file 514, and/or other media file 516 based on the user's request. The executable file 510 may be related to a learning object of the user's theme. The bookmark module 502 may allow the user to locally store an URL of a favorite page of an online study object (e.g., a learning object). The annotation module 504 may provide an explanation of a particular entity, content, and/or a topic chosen by the user. The explanation provided by the annotation module 504 may include either a text data 534 and/or a voice data 532. The text data 534 and the voice data 532 may include a comment, notes, etc. that may be used to annotate a content/topic of the user's choice illustrated on a particular page.

The history module 506 may generate a list of pages, and/or a list of URLs of the web pages that may be viewed by the user. The assessment module 524 may provide an assessment exercise to the user and provide assessment result to the user. The communication module may enable the user to communicate with a host system to access the related learning objects, and/or assessment exercises of the course. A download module 526 may enable the user to download application programs, executable files, image files, auxiliary files, etc. on the electronic device. A podcast module 528 may allow the user to download a series of media files related to a course at regular intervals through a web consortium.

FIG. 6 is a system view illustrating a communication between a learning portal, learning platform, and an authoring station, according to one embodiment.

In one embodiment, the learning portal may enable the user to access a learning a platform 602, and register to a virtual school, and/or an educational institution that may facilitate online studies. The learning portal may be a desktop computer, a notebook, laptop, etc. The user may also use a Personal Digital Assistance (PDA) 608, a cell phone 610 and/or an iPod® 612, e-book 630 to store and browse a learning object of the course. The PDA 608 may be a handheld mobile phone, a palmtop, etc. that may enable the user to access the digital data related to a course.

In another embodiment, the learning objects may be distributed (e.g., published) to the users by a content management system 614 based on the content query made by the users. A virtual school and/or an online course may be controlled by an administration management system 618. The virtual school and/or an educational institution may be managed based on government framed rules, institutional rules, etc. The gaming rules may be implemented at this stage.

In one or more embodiments, the user may be allowed to access the learning objects through a query. The user may be allowed to access the learning objects only after registering for a course through the administration management system 618. The administration management system 618 may provide the user details of the course, credit of the course, etc. The learning objects may be stored in a local repository 620 and/or a remote repository 622 and may be accessed by the registered users through a query. Even the administration module may enable the user to access only the related learning objects. An authorizing station 604 may verify the authenticity of the user and may allow the user to access only the authorized learning objects. A context management system 616 may provide the users a context to display the learning objects based on the type of the course and the objects associated with learning object.

Figure 7:
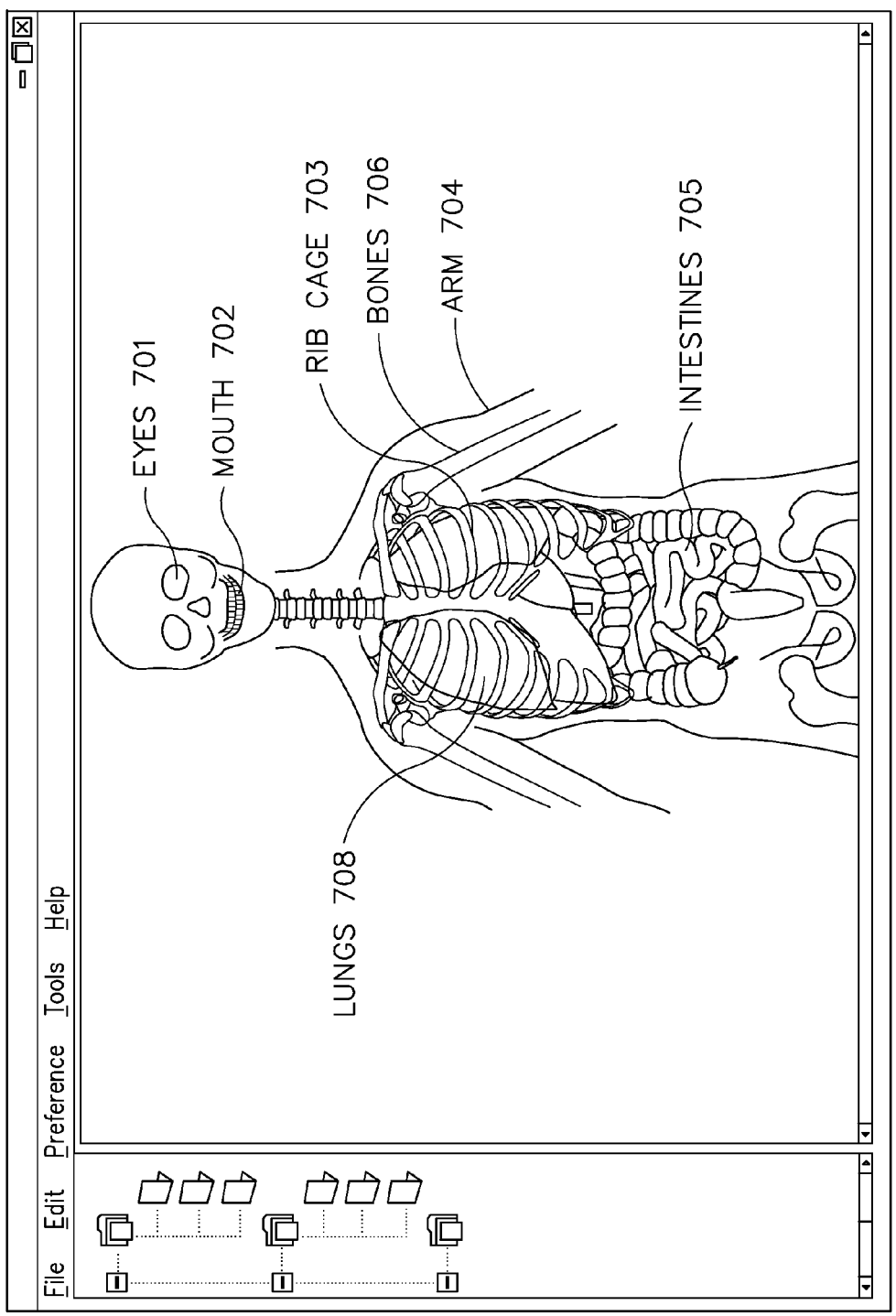
FIG. 7 is a view of the human body 700 (prior art).

FIG. 7 is a prior art showing the human body 700 and its various parts such as eyes 701, mouth 702, lungs 708, rib cage 703, arm 704, intestines 705 and bones 706. The user may enter the virtual human body based on the graphical interface created by the authoring tool. A virtual human body may be created with all the details of each physiological system such as circulatory system, function of a cell, organ function such as a liver function, journey through the heart, how the eye sees etc. The system would create a virtual human body as soon as the user chooses where and what to enter using the graphical user interface. The animation of the virtual human body with narration may be switched on and multiple players may use the same site. As a method, the user may enter a system, an organ or a call to observe different levels of activity.

Figure 8:
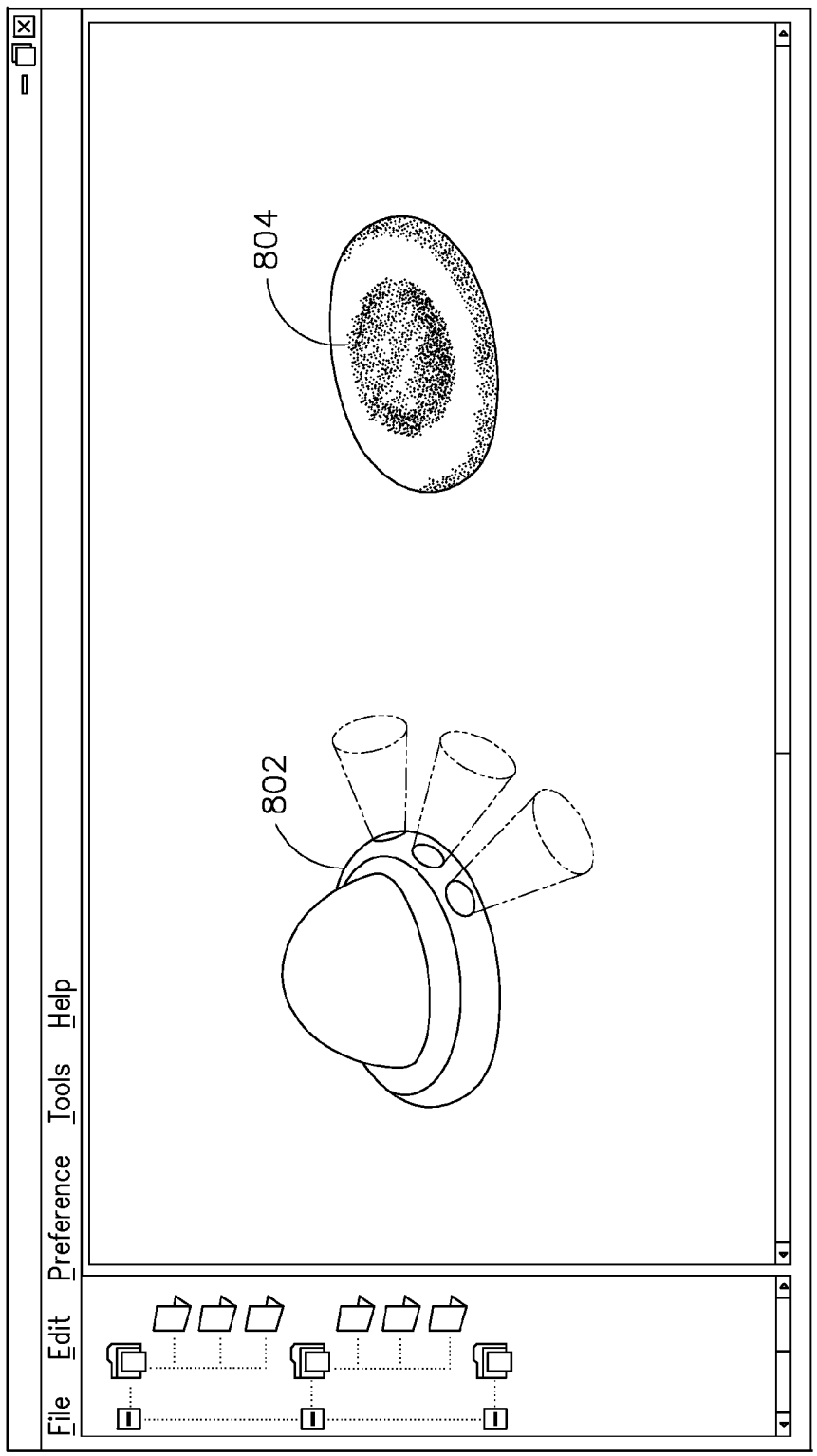
FIG. 8 is an example of choice of travel 800 to be chosen by the user, according to one embodiment.

FIG. 8 shows the choice of travel method 800. The use may choose to be in the shape of a space craft such as 802 or in the form of the red blood cell as shown in 804. The user may also have an option to choose/elect a micronutrient, bacteria or any microorganism. During the gaming sessions different players may assume different formats and play with or against each other. The purpose of this invention is to educate the user and evaluate the user for their ability to understand scientific facts and scenarios in a graphical format as well as text format. The choice of travel mode may be a virtual vehicle as an operative platform for virtual journey through the body. The user of this multimedia tool can navigate through the body and its cellular, intercellular and subcellular structures in several ways, with or without virtual devices. In one embodiment, one may travel through the circulatory system through the blood vessels in the form of a submarine shaped as a red blood cell for example.

Figure 9:
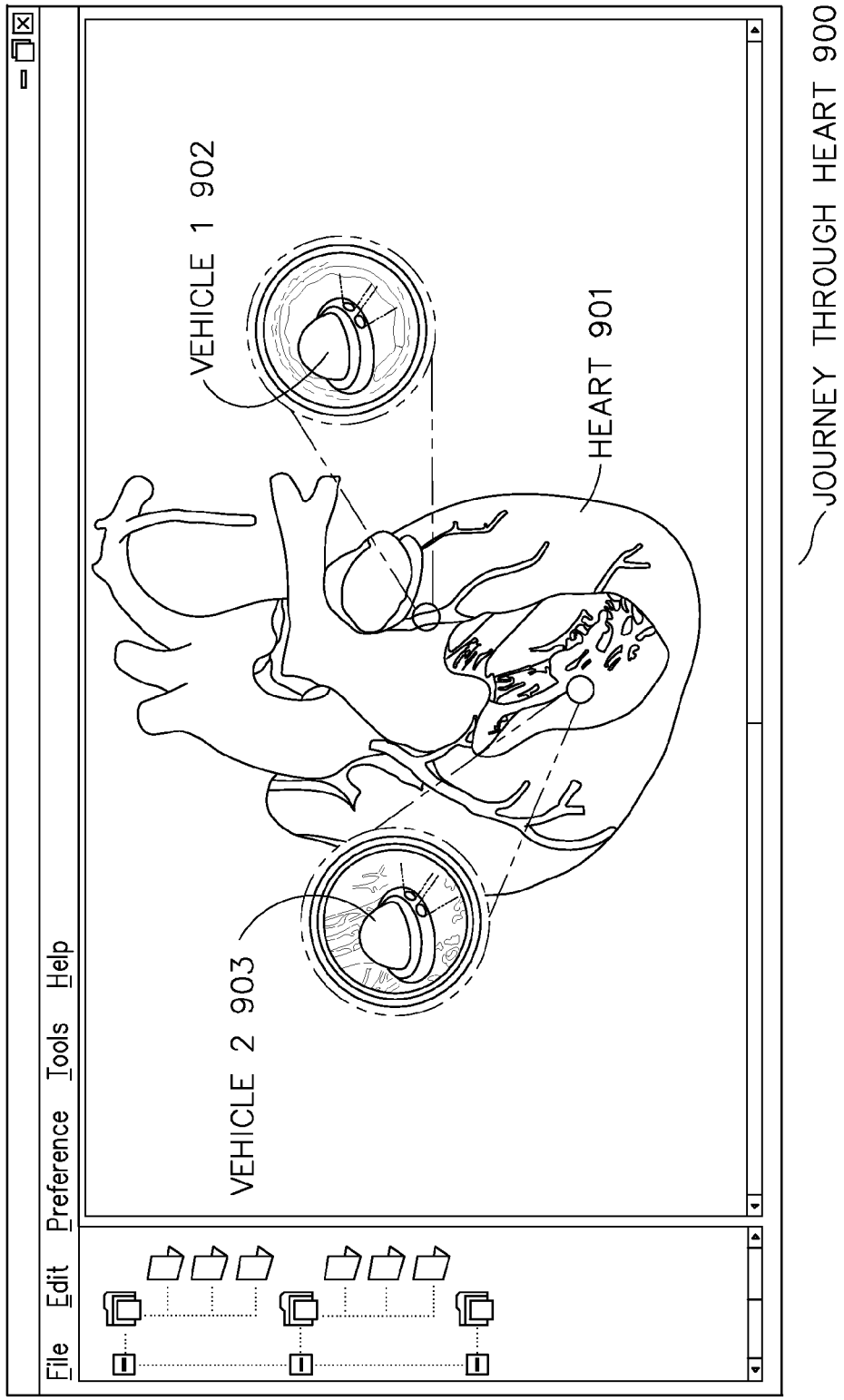
FIG. 9 is a view illustrating journey through the Heart 900, according to one embodiment.

FIG. 9 shows a graphical user interface of the journey through the heart 900. The virtual journey through the heart with the help of a virtual vehicle 903 and 902. The user may choose to enter the blood vessel system or through the chambers of the heart 901 to study the structure and function of the organ at cellular, intercellular and subcellular levels. The two vehicles may communicate with each other and narrate the local scenes. They may even invite each other to come to a specific location to observe an interesting function or dysfunction. Interesting function for example may be blood passing from one chamber to another and the valves opening and closing. An example of the dysfunction may be a dysfunctional valves and how the heart has to work twice as hard to pump the blood because of valve leakage.

Figure 10:
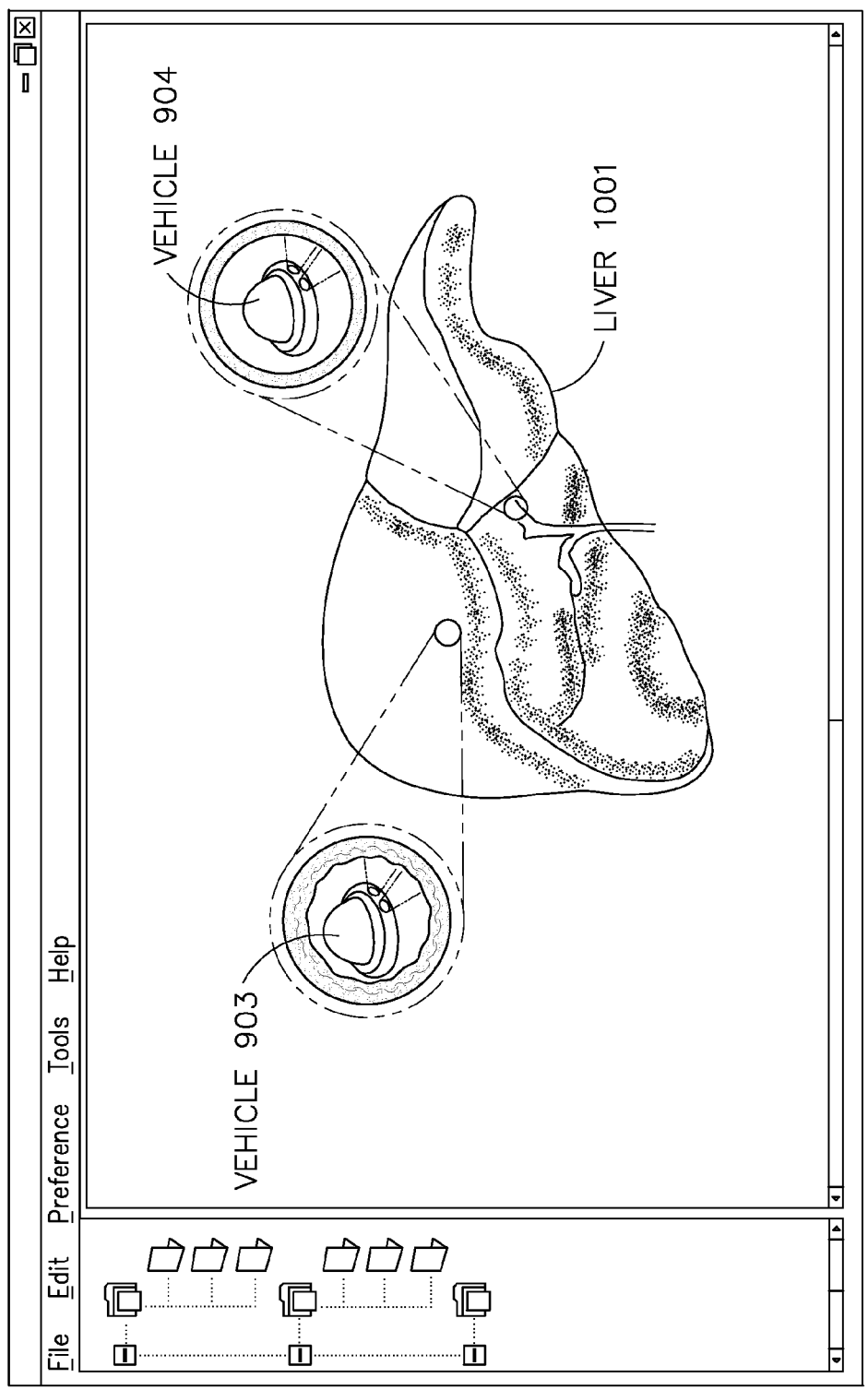
FIG. 10 is a view illustrating journey through the Liver 1000, according to one embodiment.

FIG. 10 shows a graphical user interface for journey through the liver 1000. The two vehicles 902 and 903 are present in the different lobes of the liver. The cystic duct or a bile duct may be an interesting place for one vehicle user. The functions of the liver and different cellular chemistry may be observed at a cellular level in the liver.

Figure 11:
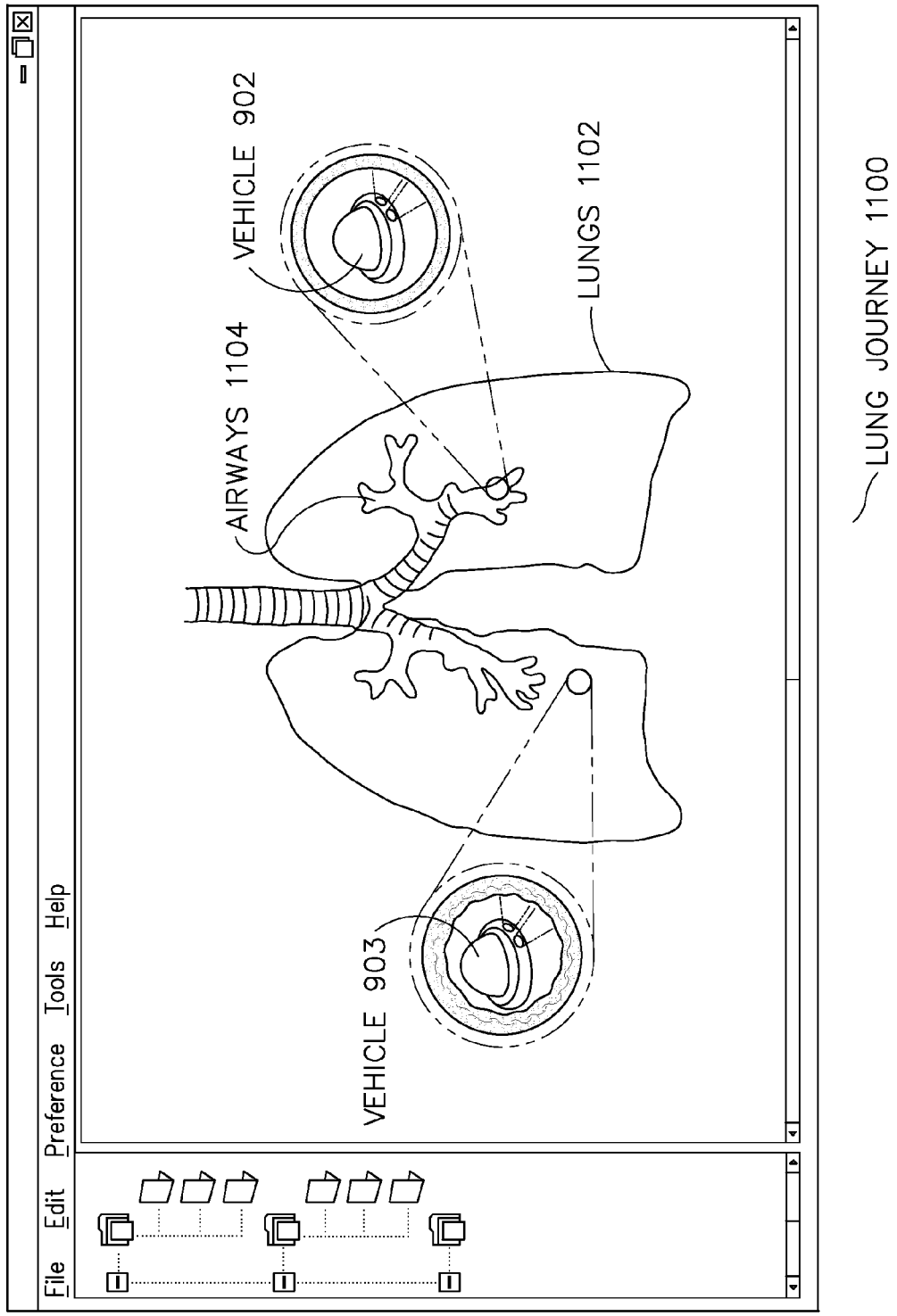
FIG. 11 is a view illustrating journey through the Lungs 1100, according to one embodiment.

FIG. 11 shows a graphical user interface for a lung journey 1100. The user may travel through the lungs by entering the airways 1104 or alveoli. The user may also enter the right or left lobes to observe the air sacs. The user may want to observe and learn about the gas exchange that happens in the lungs, the expansion of the air sacs and the collapsed lung of the smoker for example.

Figure 12:
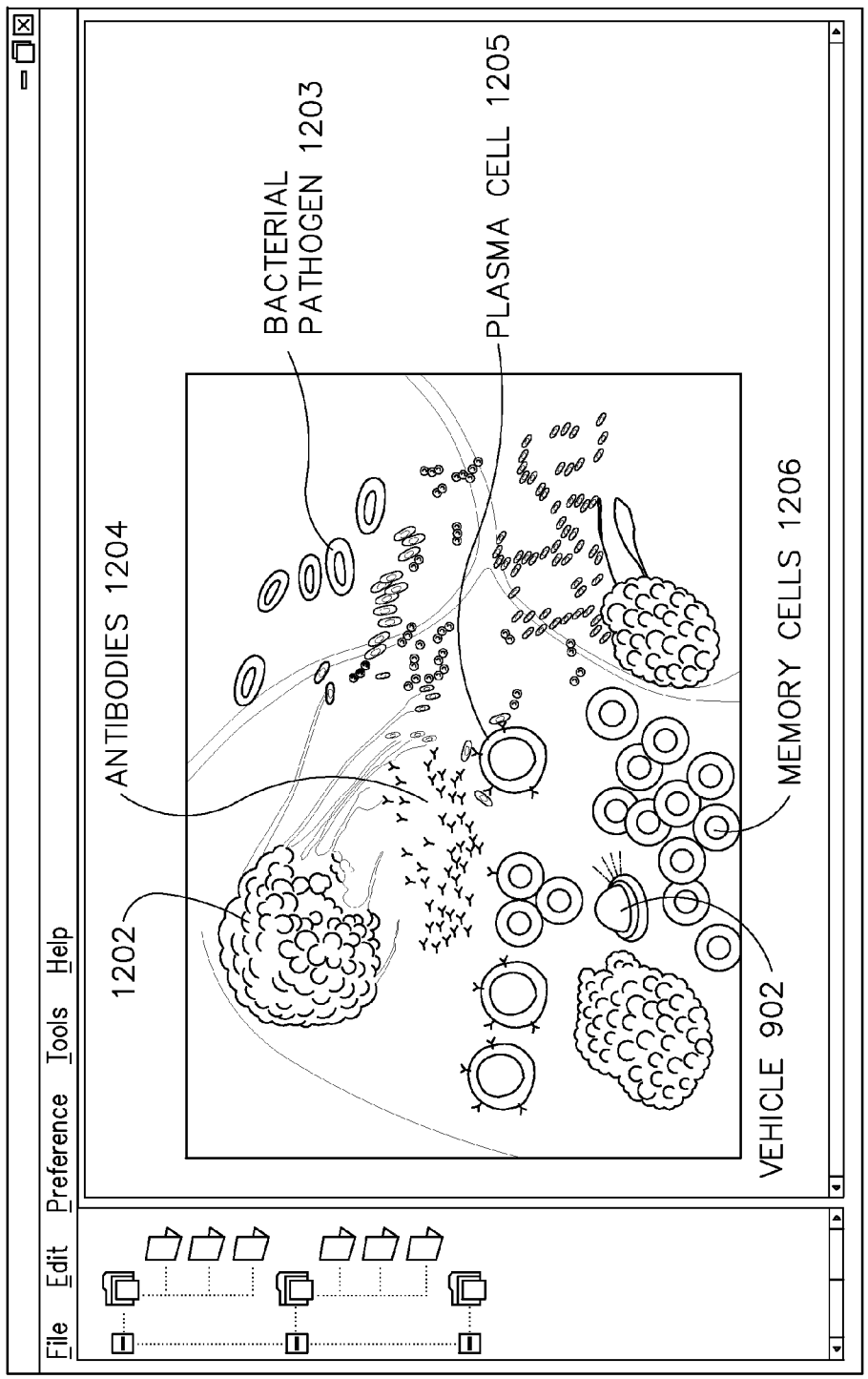
FIG. 12 is a view of Lymph node battle 1200 as a game, according to one embodiment.

FIG. 12 shows scenario at the cellular level such the lymph node battle 1200. In this embodiment a scene of the lymph node getting attacked by the bacteria 1203 is being shown. The user can choose to be bacteria and observe what happens to it or be a memory cell 1206 to see how that gets stimulated. The user may observe using a robotic vehicle 902 to observe the node level activity in a virtual human body. The macrophages attacking the bacteria or the memory cells producing antibodies or the plasma cell producing antibodies during a bacterial attack.

Figure 13:
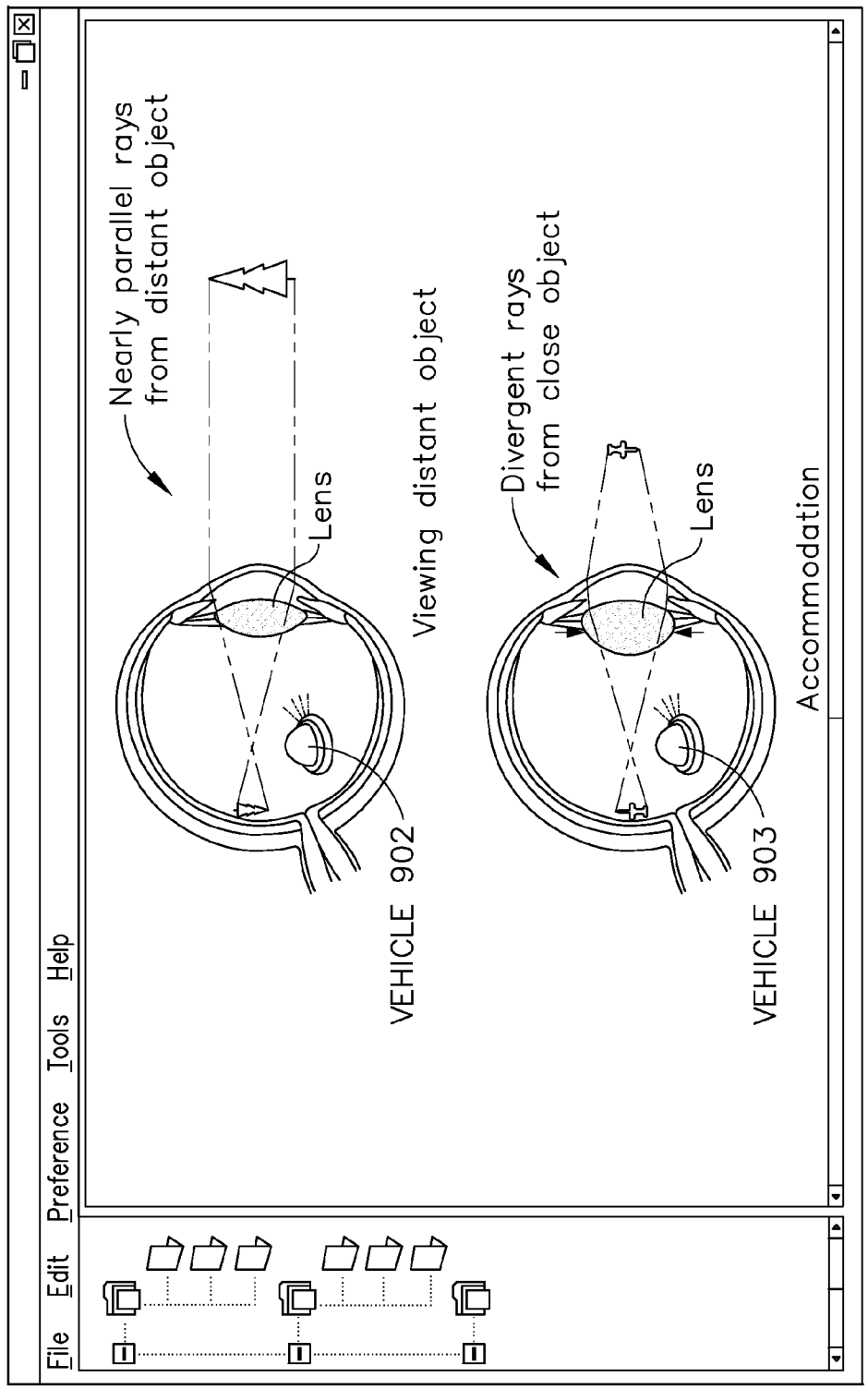
FIG. 13 is a lesson how the eye works as a vision lesson 1300, according to one embodiment.

FIG. 13 shows vision lesson 1300. In one embodiment, an eye ball is being explored using 902 or 903 vehicles to observe the contraction of the eye lens when light deflects from an object and enters the eye through the lens and the lens adjusts the curvature of the lens to accommodate the picture of the object to focus on the retina at the back. The user may understand the various parts of the eye and their positions and their functions as one is given a guided tour with narrations. In one embodiment, a user/player may change the lens position or observe the diffraction and see the retina from one side.

Figure 14:
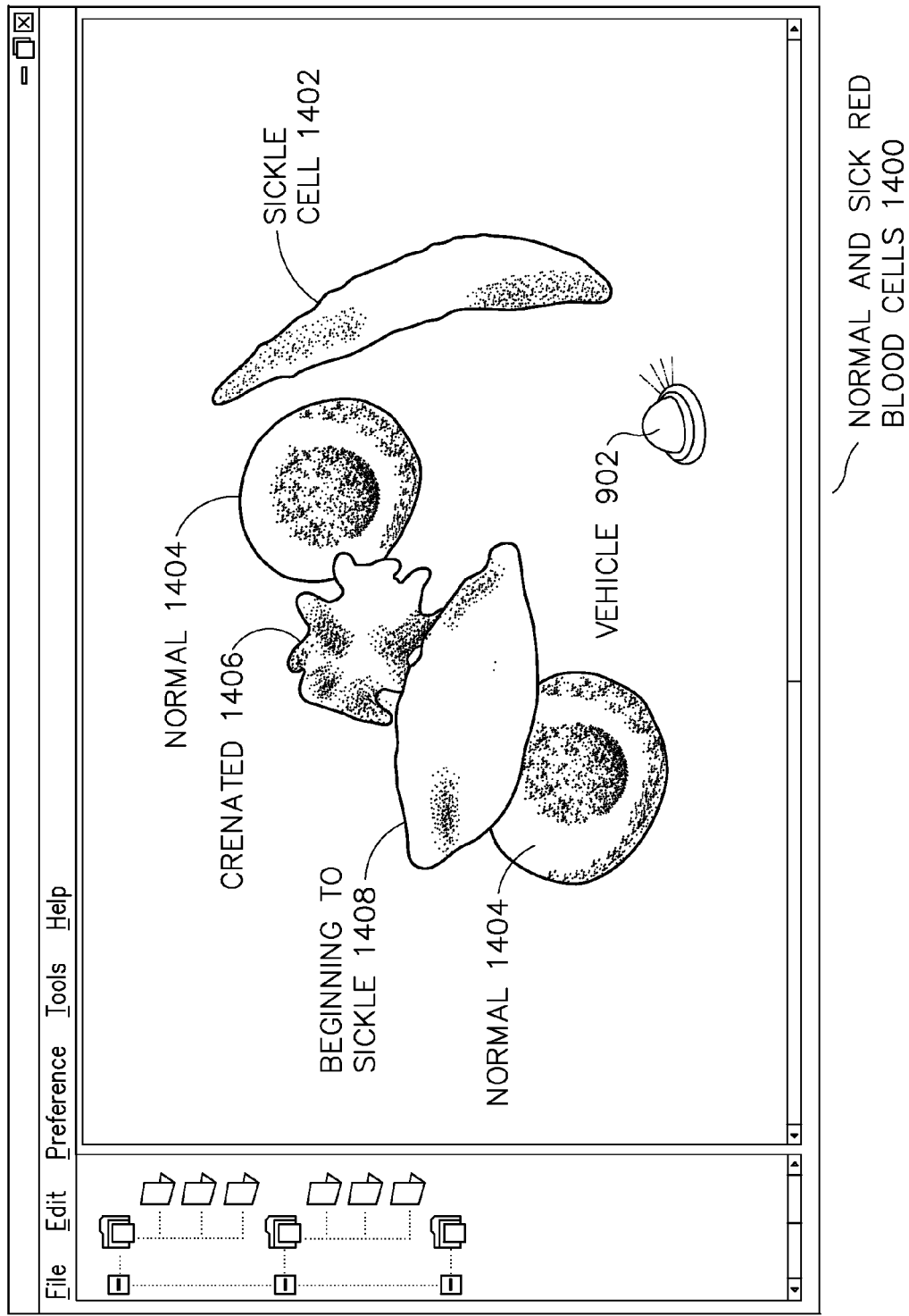
FIG. 14 is a view illustrating a student accessing a blood vessel to observe normal and sick red blood cells 1400, according to one embodiment.

FIG. 14 shows a situation of normal and sick red blood cells 1400. In one embodiment a user can see the different types of blood cells floating in a sick patient and find out what shape the red blood cell acquires when it goes through transformation during sickle cell anemia. The shape of sickled cell 1402 is different from normal cell 1404 or the beginning to sickle 1408 or crenated 1406. This exercise educates and narrates the transformation of the red blood cells in disease condition. One may be in the form of a cell or a vehicle 902 to observe this biological phenomenon in a virtual human body.

Figure 15:
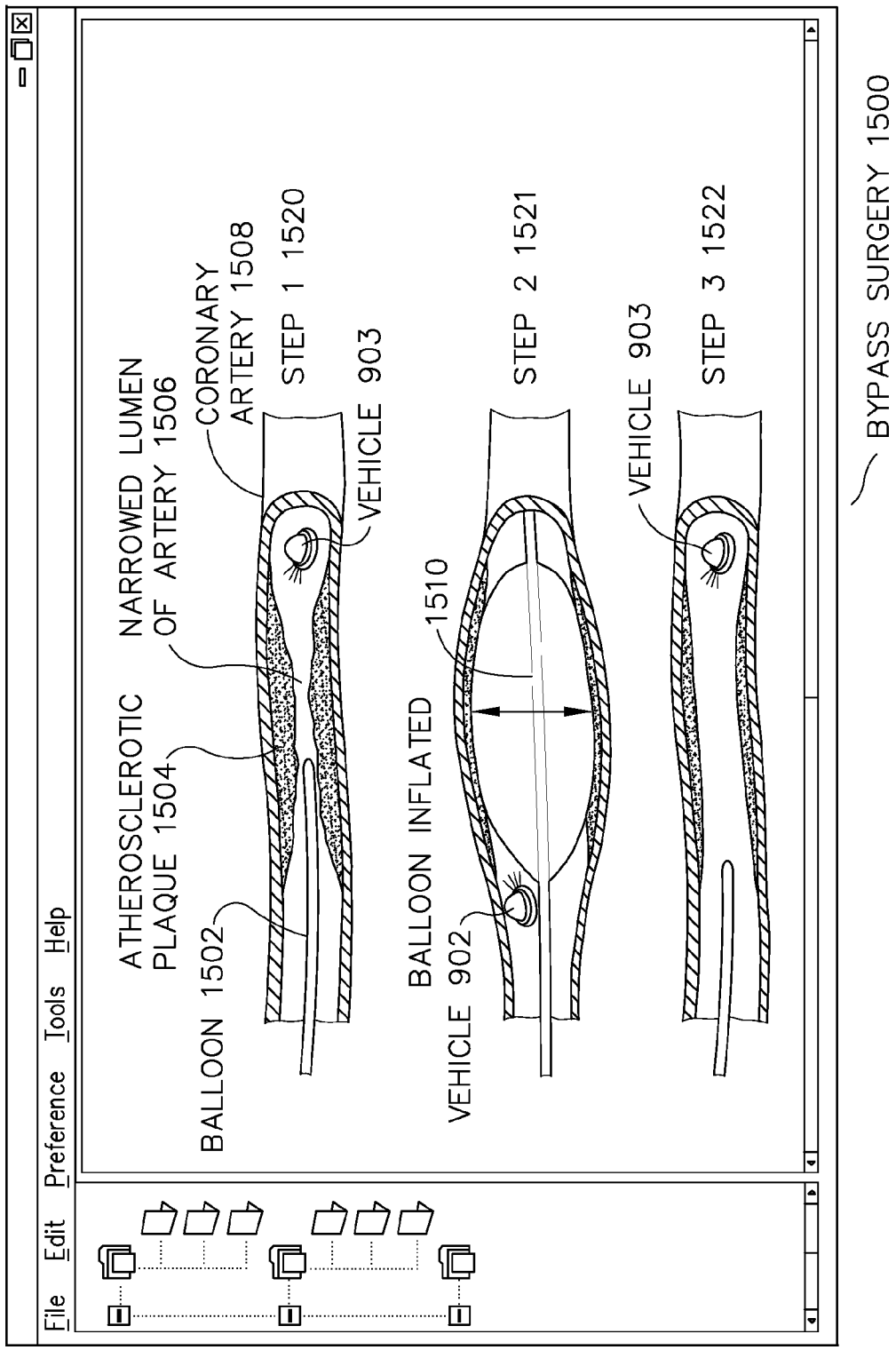
FIG. 15 is a view of bypass surgery procedure 1500 for a user to understand the procedure, according to one embodiment.

FIG. 15 is a graphical user interface view of a bypass surgery 1500 being performed, according to one embodiment. A vehicle 903 is observing a balloon 1502 being inserted into a coronary artery 1508 to expand the narrowed lumen of artery 1506 created by atherosclerotic plaque 1504. Vehicle 902 in a robot form is observing, narrating, explaining, educating an user from other side of the artery what is happening in step 2 (1521) specifically when the balloon is being inflated 1510. (03 vehicle is observing in step 3 (1522) that when the balloon is deflated the artery is widened and the normal blood may resume.

Figure 16:
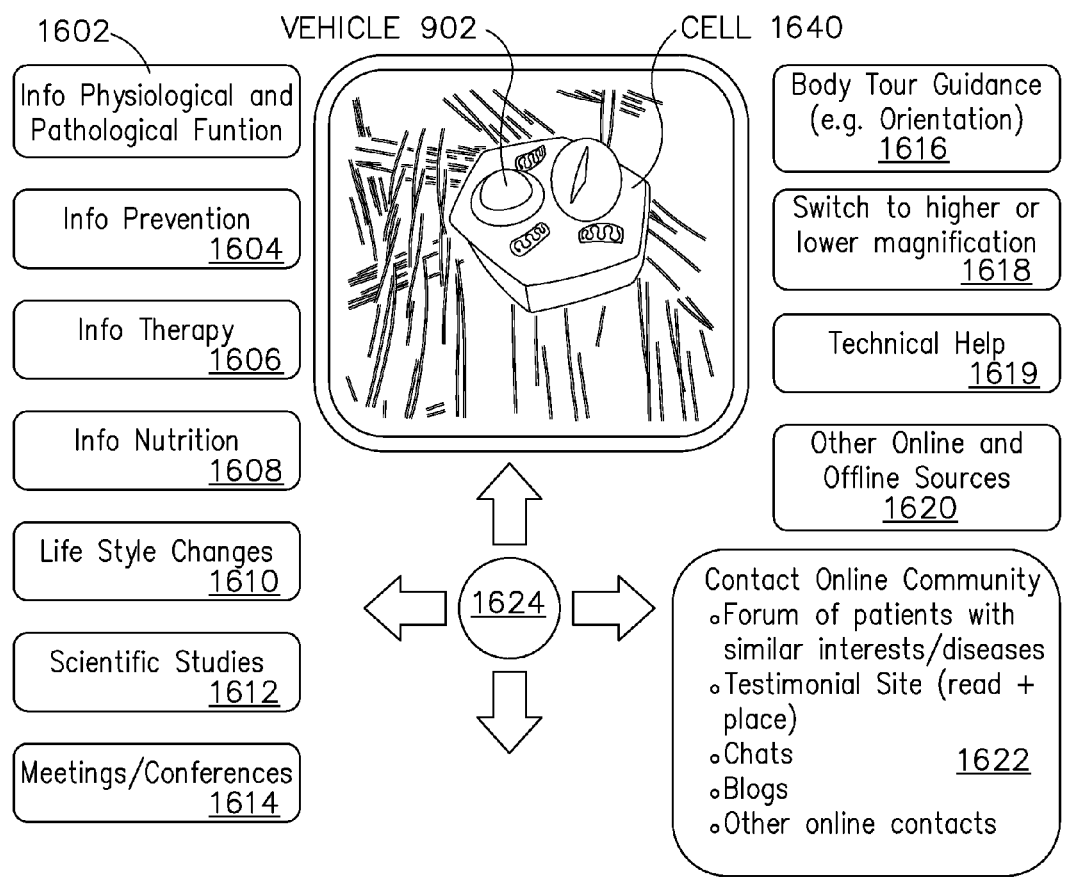
FIG. 16 is a graphical user interface view illustrating a user view 1600, according to one embodiment.

In FIG. 16, according to one embodiment, a graphical user interface view 1600 illustrates different options that are provided to the user to use the process and method of the underlying system of virtual human body exploration and education multimedia tool. The info physiological and pathological function 1602 tab may allow the user, teacher or educator to enter the tour and education aspect of the software. This option may allow an individual to select the type of tour they want to take, for example heart attack or functions of the heart etc. The user may be given an option to select a shape or form to enter a given physiological or pathological scenario. The info prevention 1604 may allow the user to get educated on various options of treatment and the associated medication and supplements associated to prevent the disease. Info therapy 1606 selection may allow user to import information from other sources or medical practitioners to upload and educate the public about a select disease condition. 1608 is a nutrition info selection option. Once an individual selects the 1602 option of a particular disease state, info nutrition 1608, life style changes 1610 advice pages, scientific studies 1612 papers or meetings and conferences 1614 related to that subject may be mined. The navigational tool 1724 allows an individual to navigate using a computer or a console having this option. 1722 option enables the user to simultaneously go online and connect to the web and social media and perform various functions such as chats, blogs, testimonials, opinions, comments and connect with similar forums. An individual may enter a cell and may want to move to an organ and then to a system to observe the cause and effect of a particular condition. The user can seamlessly transform using the graphical user interface from at least one of a cellular level, organ level and a system level as the individual changes his mind to explore different levels.

Figure 17:
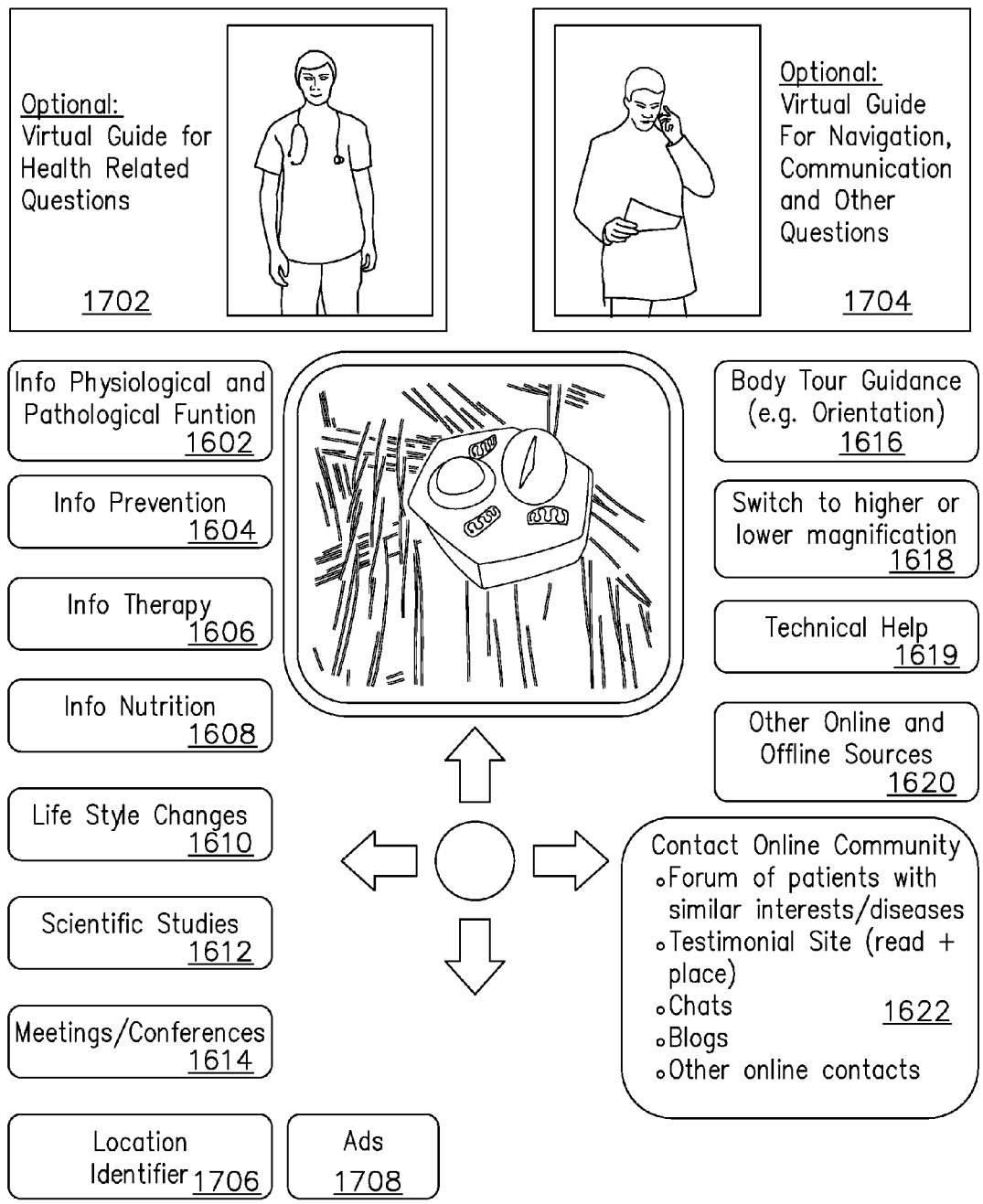
FIG. 17 is a graphical user interface illustrating a subject selection view 1700, according to one embodiment.

FIG. 17 is a graphical user interface view illustrating a group of experts that may be connected to the user, according to one embodiment. 1702 allows an user to access a virtual guide to health related issues. There are spaces for ads 1708 for sponsors on the site. The location identifier 1706 enables the user to spot the location of treatment provider, nutritional supplement providers or other relevant experts in the field.

Figure 18:
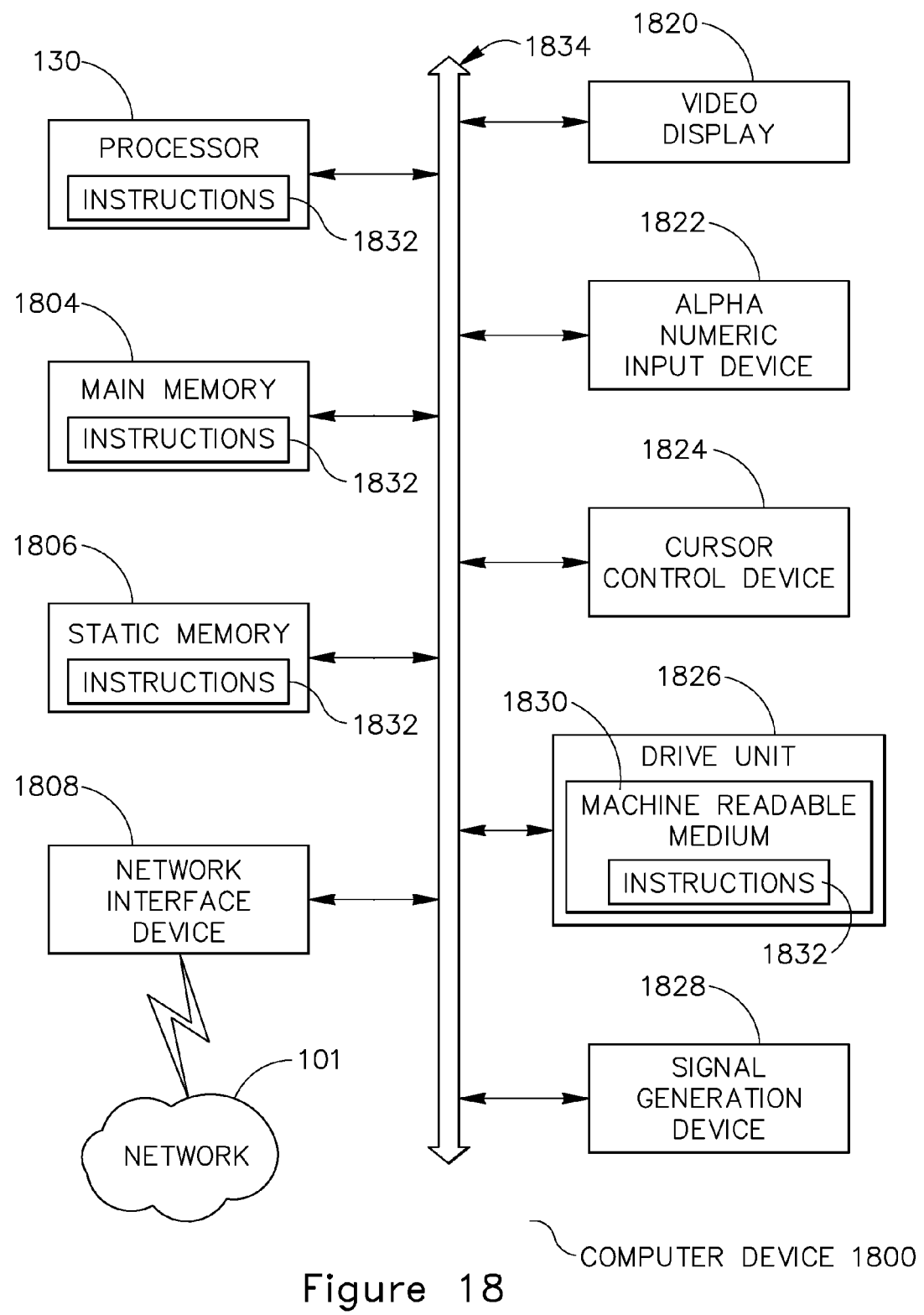
FIG. 18 is a diagrammatic system view of a computer device view in which any of the embodiments disclosed herein may be performed, according to one embodiment.

FIG. 18 is a diagrammatic system view 1800 of a computer device view in which any of the embodiments disclosed herein may be performed, according to one embodiment. Particularly, the computer system view 1800 of FIG. 18 illustrates a processor 130, a main memory 1804, a static memory 1806, a bus 1808, a video display 1810, an alpha-numeric input device 1812, a cursor control device 1814, a drive unit 1816, a signal generation device 1818, a network interface device 1820, a machine readable medium 1822, instructions 1824, and a network 1826, according to one embodiment.

The computer system view 1800 may indicate a personal computer and/or a data processing system (e.g., server) in which one or more operations disclosed herein are performed. The processor 130 may be microprocessor, a state machine, an application specific integrated circuit, a field programmable gate array, etc. The main memory 1804 may be a dynamic random access memory and/or a primary memory of a computer system. The static memory 1806 may be a hard drive, a flash drive, and/or other memory information associated with the computer system. The bus 1808 may be an interconnection between various circuits and/or structures of the computer system. The video display 1810 may provide graphical representation of information on the data processing system. The alpha-numeric input device 1812 may be a keypad, keyboard and/or any other input device of text (e.g., a special device to aid the physically handicapped). The cursor control device 1814 may be a pointing device such as a mouse.

The drive unit 1816 may be a hard drive, a storage system, and/or other longer term storage subsystem. The signal generation device 1818 may be a bios and/or a functional operating system of the data processing system. The network interface device 1820 may be a device that may perform interface functions such as code conversion, protocol conversion and/or buffering required for communication to and from a network (e.g., the network 101 of FIG. 1). The machine readable medium 1822 may provide instructions on which any of the methods disclosed herein may be performed. The instructions 1824 may provide source code and/or data code to the processor 1802 to enable any one/or more operations disclosed herein.

Figure 19:
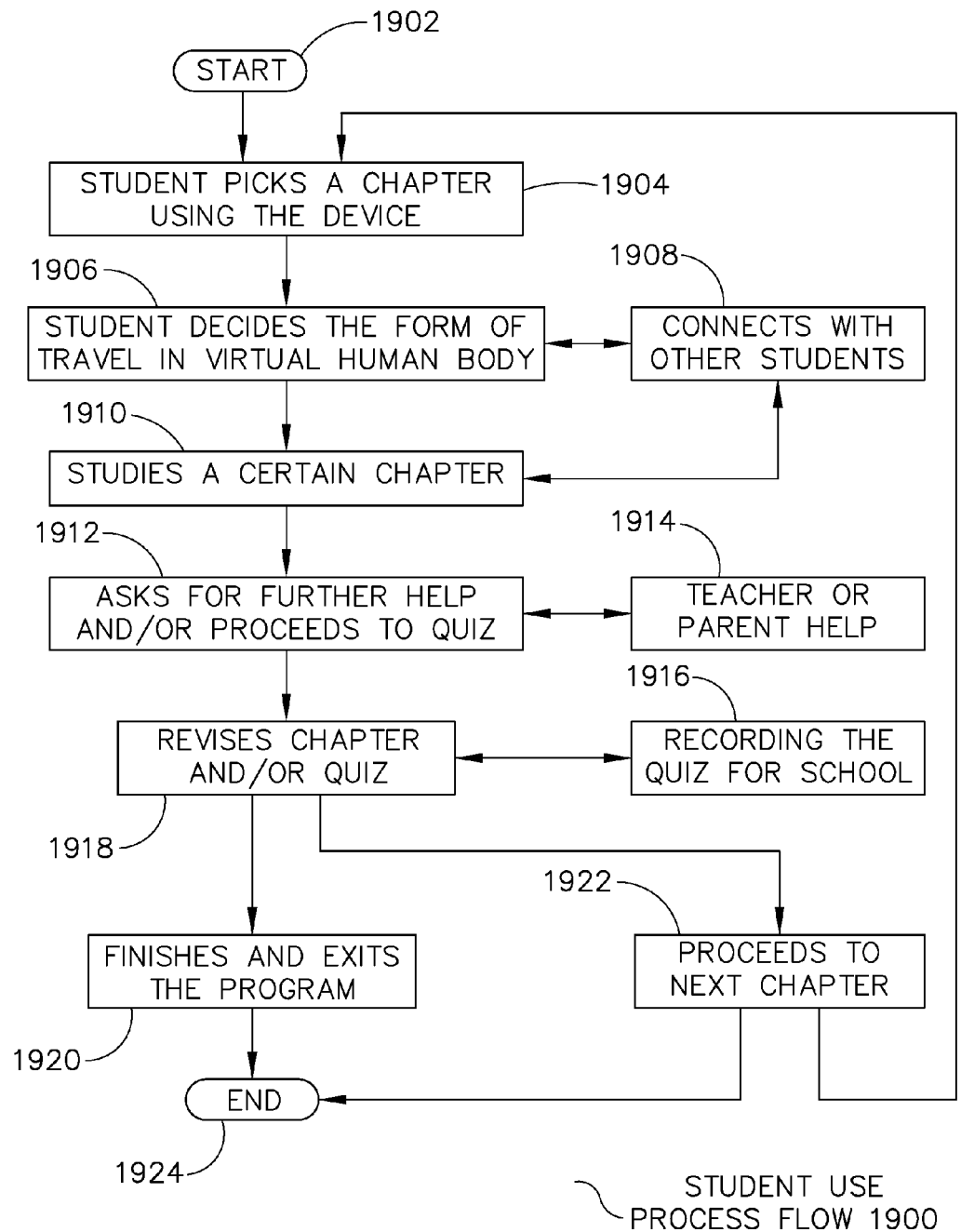
FIG. 19 is a flow chart of student use process flow 1900, according to one embodiment.

FIG. 19 displays a flow chart of a student process flow. The machine readable media may host, run and display an interactive multimedia tool that is modular for a student to pick a chapter of choice that is prescribed in the curriculum by the local authority to at least one of study, train, teach, instruct, investigate, research and examine inside/outside the virtual human body (1904). The student may decide to use a form of a robot or any cellular organelle or micronutrient as a shape or a ride and travel through the virtual human body (1906). He may use any form of hardware such as a computer, PDA, electronic book or a tablet to use the multimedia tool. The curriculum would be prescribed from a governing authority such as a school or college or medical school or a centrally test conducting center such as a medical licensing board etc. The student may use a module at a time. The module may be a chapter, or a test, or a segment of the tour, but limited to, in the virtual human body.

The student may connect with as assigned group for a group activity assigned by the teacher to fulfill a task (1908) or may use the net work connectivity and invite friends to study or play, or solve a quiz by role playing. For example, during normal respiration, air travels through the nose, down the trachea, and into smaller and smaller airways called bronchi. The bronchi divide into bronchioles and finally into tiny grape-like clusters of thin, fragile sacs called alveoli. In the alveoli, oxygen is exchanged for carbon dioxide in the blood. Pneumonia is a serious infection or inflammation of your lungs. The alveoli fill with pus and other liquid blocking oxygen from reaching your blood. If there is too little oxygen in your blood, your body's cells can't work properly. Pneumonia affects your lungs in two ways. Lobar pneumonia affects a section (a lobe) of a lung. Bronchial pneumonia (or bronchopneumonia) affects patches throughout both lungs. Pneumonia is not a single disease. It can have over 30 different causes. There are five main causes of pneumonia: 1) Bacteria, 2) Viruses, 3) Mycoplasmas, 4) Other infectious agents, such as fungi—including pneumocystis, 5) Various chemicals.

The student may be asked to explore the symptoms, available treatment methods or alternative medicines and supplements. A student may inquire another fellow participating such as a teacher (1914) or another student or any other individual (1908) who is online to suggest, teach or role play. The student may be the microorganism and the other player may use nutrients such as vitamin C to combat the attack. The cause and effect of the pathway by which the vitamin C may be beneficial may be either narrated or displayed or relevant research papers may be displayed on the graphical user interface for the users to access.

The student may further decide to take the quiz in order to comply with the grade requirements (1918) and once the test is finished the grades may be recorded by the proper authorities (1916). The student may then decide to finish and exit the system (1920) or go on with another chapter (1922). Finally the process ends 1924 after the student has logged of the system.

Figure 20:
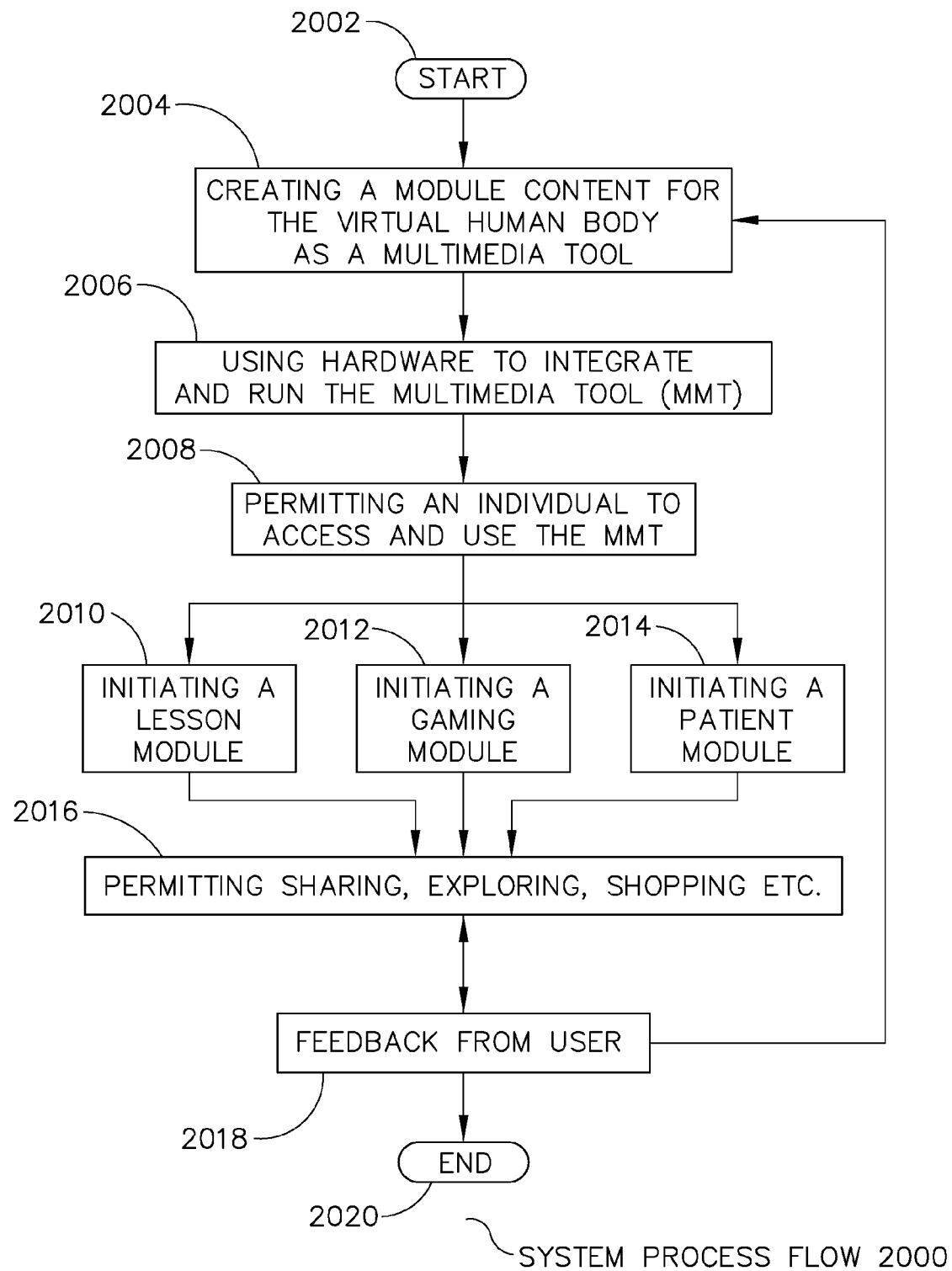
FIG. 20 is a flow chart of system process flow 2000, in one embodiment.

FIG. 20 shows a process flow from a system process flow 200 perspective. This particular flow may be used by the content creators such as programmer, teachers, and administrative authorities. Modules may be created by allowing various experts in the field to contribute to a specific topic. For example, cancer of prostate cancer may be authored by cancer treatment specialist, software programmers that may provide code for the graphical display, compilation of the code and hosting the code on a server and providing network connectivity for the user, teachers and area experts and providers. The multimedia modules are integrated in a modular way so that insertion deletion and updates may be made in pieces rather than the whole software code for the multimedia tool to be disturbed (2006). The given modular multimedia tool may run on various operating systems used in the industry such as android but not limited to it. The system integrator may allow users (2008) to access with subscription, group permissions or individual permissions to use the multimedia tool (MMT).

The multimedia tool may be modular, scalable and integrated for using at different platforms. The individual may decide to initiate a lesson module 2010, initiate a gaming module 2012 and/or initiate a patient module 2014 to start a set of program to be the virtual human body using the multimedia tool. Once a decision tree is taken then permissions for sharing, exploring, shopping etc 2016 may be initiated. Online navigation and global positioning system may also be started once the individual decides to shop while they are using the multimedia tool on a device such as a computer or PDA. Feedback from user 2018 may be given to the programmers and/or service providers and/or users for future enhancements. The user after a session may end 2020 it and may be allowed to enter by going to a start point 2002 on a graphical user interface.

FIG. 21 shows another embodiment of a process flow from the patient perspective 2100. A patient logs into the system of MMT and picks a disease of interest 2104. He has just finished his initial visit with his doctor and has been told he suffers from cancer. Patient studies the disease profile 2106 to get further clarification and get better educated by the MMT. One can go to internet and read all they want and not recognize how the whole human body works as system and what is the effect of various factors and the change management by the body. The cause and effect of nutrition, exercise and medications may be simulated for the patient to have a comprehensive look of the disease 2110. The various diseases may be added as a scalable module for use. The patient may also observe a graphical presentation of the progression of the disease in a normal course 2108. The patient may want to do more research 2114 and use online research papers 2124 or other internet resources such as alternative medicines 2126, support groups 2122, user groups 2120 and blogs 2118. After getting a full knowledge the patient may try and simulate various scenarios by using MMT in a virtual human body and observe the effect 2130. The patient with their physician may decide to go forward with the treatment 2132. Once the decision is made the patient may exit the software MMT.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, apparatuses and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
   creating a virtual human body as a modular multimedia tool for an individual to study, train, teach, learn, travel and investigate using a machine readable media;
   enabling the individual to choose a position to enter the virtual human body and travel using a transportation system of choice and investigate through the virtual human body at least one of a cellular level, an organ level and a system level and further entering seamlessly to transform the graphical user interface at least one of two different said levels to study, train, teach, learn, travel a physiological function at least one of the system level, organ level and cellular level; and
   connecting with a social media module to at least one other user to interact and travel through the virtual human body.

2. The method of claim 1, wherein the system level is at least one of circulatory system, respiratory system, digestive system, musculoskeletal system, endocrine system, integumentary system, immune system, lymphatic system, reproductive system, urinary system, vestibular system and nervous system.

3. The method of claim 1, wherein the organ level is at least one of a brain, amygdala, basal ganglia, brain stem, medulla, midbrain, pons, cerebellum, cerebral cortex, hypothalamus, limbic system, eye, pituitary, thyroid, parathyroids, ears, heart, lung, esophagus, thymus, pleura, adrenals, appendix, bladder, gallbladder, large intestine, small intestine, kidney, liver, pancreas, spleen, stomach, prostate, testes, ovaries, uterus, breasts, hips, legs and throat.

4. The method of claim 1, wherein the cellular level as components are at least one of nucleus, nucleolus (within nucleus), rough endoplasmic reticulum (ER), smooth ER, ribosomes, cytoskeleton, golgi apparatus, cytoplasm, mitochondria, vesicles, lysosomes, centrosome, centrioles, red blood cells, white blood cells, bacteria, virus, t-cells, macrophages and phagocytes.

5. The method of claim 1, further comprising:
using a context module by the student to learn, interact and invite other group members to participate using the modular multimedia tool for the virtual human body; and
taking an assessment test using the modular multimedia tool created for the tour of a virtual human body for evaluation purposes.

6. The method of claim 1, further comprising:
acquiring a data about a disease diagnosed by a physician in detail using the modular multimedia tool created for the virtual human body;
viewing a progression of the disease diagnosed by the physician in detail and learning a natural progression of the disease and the implication for the natural disease progression;
researching an implication of a proposed treatment plan and browsing at least one of a blog, social media group, user group and alternative treatment sites; and
deciding on a treatment method plan with the physician.

7. The method of claim 6, wherein the disease is at least one of autoimmune diseases, cancer types, communication disorders, cutaneous conditions, metabolic disorders, endocrine diseases, eye diseases and disorders, genetic disorders, infectious diseases, intestinal diseases and neurological disorders.

8. The method of claim 1, further comprising;
enabling user to upload information and tag a data;
storing the data for future use;
incorporating expert opinions as and when it becomes available; and
enabling monetary transaction between two entities if the user decides to buy using the multimedia tool.

9. The method of claim 8, further comprising:
marking the progress of the disease after a treatment regimen; and
retrieving a medical information for future use.

10. A process, comprising:
creating a content for the content module for a multimedia tool having a capability to display a virtual human body at least one of at a cellular level, organ level and a system level;
permitting an individual to enter the virtual human body at least at the cellular level, organ level and system level seamlessly using a transportation system and an exploration shape of choice through the multimedia tool to travel through at least one of at the cellular level, organ level and system level and further entering seamlessly to transform the graphical user interface at least one of two different said levels; and
initiating a gaming module to enable the individual to play a tour of the virtual human body and modulate the microenvironment at least one of at the cellular level, organ level and a system level.

11. The process of claim 10, further comprising:
exiting a location of choice from at least one of cellular level, organ level and system level.

12. The process of claim 11, further comprising:
granting role play capability for one or more individuals to participate in a disease condition.

13. The process of claim 11, further comprising:
connecting a at least one of a health care professional, student, teacher, parent and service provider to the individual.

14. The process of claim 13, further comprising:
enabling an authority to upload and assess the individual performance of a student for a particular educational level.

15. The process of claim 10, further comprising:
permitting a service provider to advertise, sell and solicit at least one of nutritional product and a medicine of choice.

* * * * *